US011243911B2

(12) United States Patent
Thomas et al.

(10) Patent No.: US 11,243,911 B2
(45) Date of Patent: *Feb. 8, 2022

(54) METHOD AND APPARATUS FOR FAULT-TOLERANT MEMORY MANAGEMENT

(71) Applicant: TUXERA US INC, Bothell, WA (US)

(72) Inventors: Brandon Thomas, Camano Island, WA (US); Jeremy Glenn Sherrill, Bothell, WA (US)

(73) Assignee: TUXERA US INC, Bothell, WA (US)

( * ) Notice: Subject to any disclaimer, the term of this patent is extended or adjusted under 35 U.S.C. 154(b) by 216 days.

This patent is subject to a terminal disclaimer.

(21) Appl. No.: 16/181,190

(22) Filed: Nov. 5, 2018

(65) Prior Publication Data

US 2019/0310966 A1 Oct. 10, 2019

Related U.S. Application Data

(60) Continuation of application No. 14/038,705, filed on Sep. 26, 2013, now Pat. No. 10,120,869, which is a (Continued)

(51) Int. Cl.
*G06F 16/14* (2019.01)
*G06F 16/10* (2019.01)
*G06F 16/23* (2019.01)

(52) U.S. Cl.
CPC ............ *G06F 16/148* (2019.01); *G06F 16/10* (2019.01); *G06F 16/2358* (2019.01)

(58) Field of Classification Search
CPC ..... G06F 16/148; G06F 16/10; G06F 16/2358
See application file for complete search history.

(56) References Cited

U.S. PATENT DOCUMENTS 4,901,231 A 2/1990 Bishop
5,504,883 A 4/1996 Coverston
(Continued)

OTHER PUBLICATIONS

Office Action dated Jul. 9, 2012, from U.S. Appl. No. 12/638,923, filed Dec. 15, 2009, 17 pages.
(Continued)

*Primary Examiner* — Albert M Phillips, III
*Assistant Examiner* — Fatima P Mina
(74) *Attorney, Agent, or Firm* — Christensen O'Connor Johnson Kindness PLLC

(57) ABSTRACT

A device and method for providing a fault-tolerant file system. The fault-tolerant file system attempts to minimize the number of writes used when updating file system data structures. In one embodiment, file system data, including file system metadata, is stored in a fault-tolerant tree including a working state and a transacted state. In one embodiment, a change list is used to track blocks that have been updated, instead of cascading updates to leaf nodes up the tree, and a delta block is used to further minimize block updates when adding or removing nodes from the tree. In one embodiment, a Q-Block is used to prevent cycles when adding and removing free blocks from an allocation tree. Metadata values are stored in the tree in a way that allows certain metadata values to be inferred when not present in the tree, thus conserving space and lowering query time.

14 Claims, 22 Drawing Sheets

Related U.S. Application Data division of application No. 12/638,923, filed on Dec. 15, 2009, now Pat. No. 8,572,036.

(60) Provisional application No. 61/138,765, filed on Dec. 18, 2008.

(56) References Cited

U.S. PATENT DOCUMENTS

| | | | |
|---|---|---|---|
| 5,566,328 A | 10/1996 | Thomas |
| 5,761,677 A | 6/1998 | Senator |
| 5,828,876 A | 10/1998 | Fish |
| 5,875,444 A | 2/1999 | Hughes |
| 5,946,686 A | 8/1999 | Schmuck |
| 5,991,862 A | 11/1999 | Ruane |
| 6,038,570 A | 3/2000 | Hitz |
| 6,044,377 A | 3/2000 | Gavaskar |
| 6,138,126 A | 10/2000 | Hitz |
| 6,353,837 B1 | 3/2002 | Blumenau |
| 6,493,804 B1 | 12/2002 | Soltis |
| 6,571,261 B1 | 5/2003 | Wang-Knop |
| 6,615,224 B1 | 9/2003 | Davis |
| 6,636,879 B1 | 10/2003 | Doucette |
| 6,640,233 B1 | 10/2003 | Lewis |
| 6,643,654 B1 | 11/2003 | Patel |
| 6,654,772 B1 | 11/2003 | Crow |
| 7,284,101 B2 | 10/2007 | Gislason |
| 8,060,481 B1 | 11/2011 | Harmer |
| 8,249,415 B2 | 8/2012 | Yahata |
| 8,306,384 B2 | 11/2012 | Yahata |
| 2001/0047430 A1 | 11/2001 | Dev |
| 2002/0078239 A1 | 6/2002 | Howard |
| 2002/0078244 A1 | 6/2002 | Howard |
| 2002/0083037 A1 | 6/2002 | Lewis |
| 2002/0091670 A1 | 7/2002 | Hitz |
| 2002/0112022 A1 | 8/2002 | Kazar |
| 2002/0136406 A1 | 9/2002 | Fitzhardinge |
| 2002/0138502 A1 | 9/2002 | Gupta |
| 2002/0161911 A1 | 10/2002 | Pinckney |
| 2003/0158836 A1 | 8/2003 | Venkatesh |
| 2003/0158863 A1 | 8/2003 | Haskin |
| 2003/0158873 A1 | 8/2003 | Sawdon |
| 2003/0159007 A1 | 8/2003 | Sawdon |
| 2003/0182253 A1 | 9/2003 | Chen |
| 2003/0182313 A1 | 9/2003 | Federwisch et al. |
| 2003/0182317 A1 | 9/2003 | Kahn |
| 2003/0182389 A1 | 9/2003 | Edwards |
| 2003/0191745 A1 | 10/2003 | Jiang |
| 2003/0195903 A1* | 10/2003 | Manley ............... G06F 16/10 |
| 2004/0103199 A1 | 5/2004 | Chao |
| 2005/0027748 A1 | 2/2005 | Kisley |
| 2005/0114289 A1 | 5/2005 | Fair |
| 2006/0031269 A1* | 2/2006 | Gislason ............. G06F 16/10 |
| 2006/0136446 A1 | 6/2006 | Hughes |
| 2007/0073740 A1 | 3/2007 | Kirshenbaum |
| 2008/0005141 A1 | 1/2008 | Zheng et al. |

OTHER PUBLICATIONS

Notice of Allowance dated Jun. 24, 2013, from U.S. Appl. No. 12/638,923, filed Dec. 15, 2009, 10 pages.

* cited by examiner

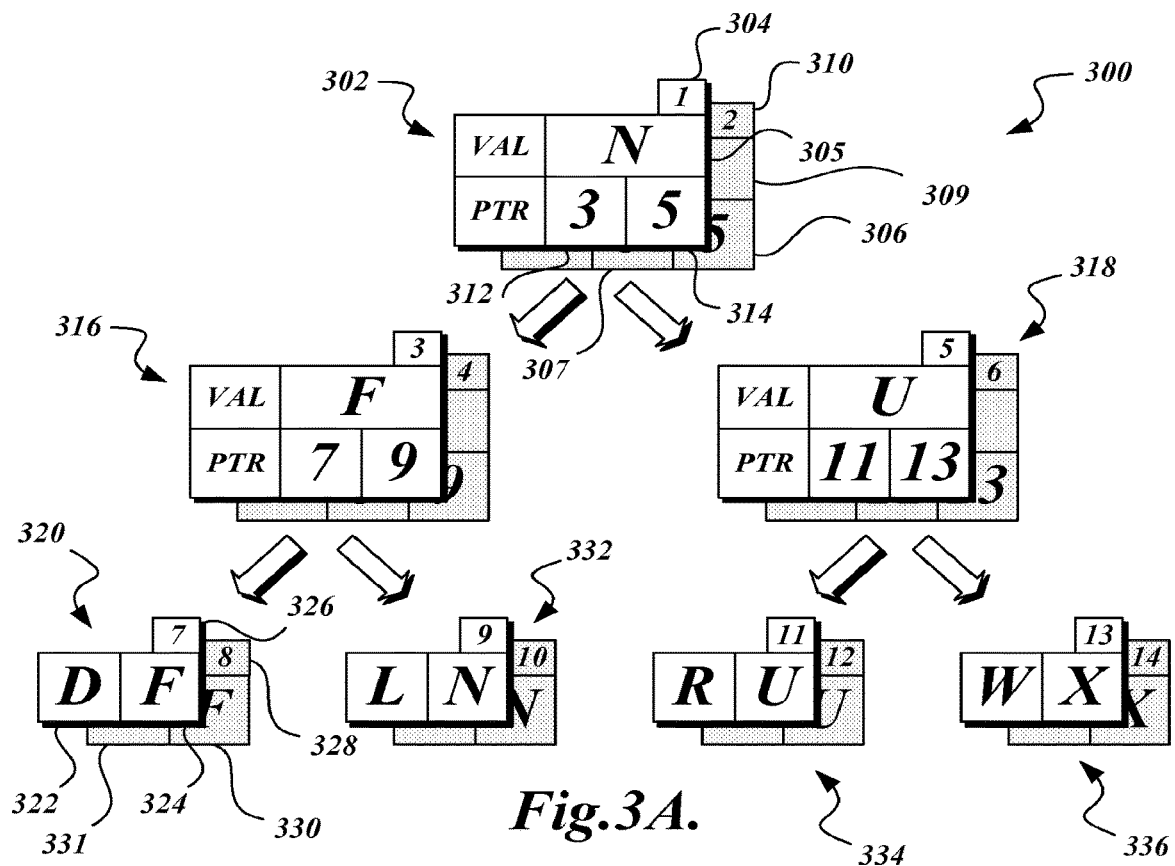
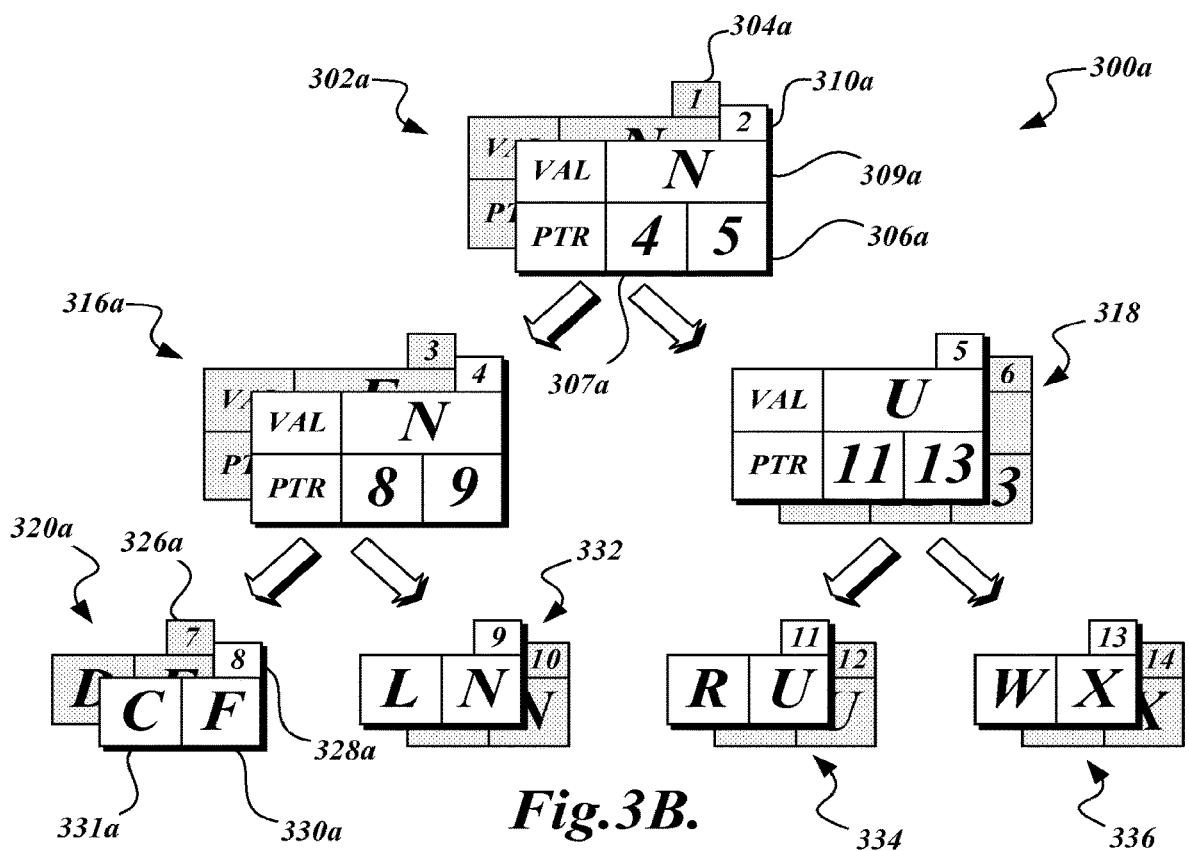
Fig.3A.
Fig.3B.

*900*

| KEY ELEMENT | SIZE |
|---|---|
| PARENT FILE NUMBER | 30 |
| CRC | 14 |
| DUPLICATE COUNT | 14 |
| SEQUENCE NUMBER | 6 |

| 5 | 27AC | 0 | 1 |
|---|---|---|---|
| FOO.TXT | | | 7 |

| 5 | 3A41 | 0 | 1 |
|---|---|---|---|
| THIS IS | | | 8 |

*912b* — *914b*

*918*

| 5 | 3A41 | 0 | 2 |
|---|---|---|---|
| A VERY LONG | | | |

*920* — *922*

| 5 | 3A41 | 0 | 3 |
|---|---|---|---|
| FILE NAME | | | |

| KEY ELEMENT | SIZE |
|---|---|
| FILE NUMBER | 30 |
| PRIMARY/SECONDARY | 1 |
| STREAM TYPE | 1 |
| OFFSET | 32 |

*Fig.10A.*

| 7 | 0 | 0 | 4 |
|---|---|---|---|
| 3A32CF28 | | 5 | |

*Fig.10B.*

| OFFSET VALUE | FIELD |
|---|---|
| 0 | GROUP ID/USER ID |
| 1 | LINK COUNT/PERMISSIONS |
| 2 | FILE ATTRIBUTES |
| 3 | LAST ACCESSED DATE/TIME |
| 4 | LAST MODIFIED DATE/TIME |
| 5 | CREATION DATE/TIME |
| 6...X | RESERVED |
| X+1... | OEM ATTRIBUTES |

*Fig.11A.*

| 7 | 0 | 1 | 5 |
|---|---|---|---|
| September 25, 2009 | | | |

*Fig.11B.*

METHOD AND APPARATUS FOR FAULT-TOLERANT MEMORY MANAGEMENT

CROSS-REFERENCE TO RELATED APPLICATION

This application is a continuation of U.S. application Ser. No. 14/038,705, filed Sep. 26, 2013, which is a division of U.S. application Ser. No. 12/638,923, filed Dec. 15, 2009, which claims the benefit of U.S. Provisional Patent Application No. 61/138,765, filed Dec. 18, 2008, the entire disclosures of which are hereby incorporated by reference herein.

BACKGROUND

Modern consumer electronic devices such as cell phones, portable game systems, cameras, etc., are memory-intensive. The memory-intensive nature of these devices has led to an increase in the use of flash memory, since flash memory is ideally suited for use in many modern consumer electronic devices. For certain types of flash memory, reading from the memory can be a relatively fast operation, whereas writing to the memory is slow, and therefore computationally expensive. In addition, repeated writes to a block of flash memory can shorten the lifespan of the memory. Also, since flash memory is often included in battery operated, portable electronic devices, flash memory is prone to experiencing frequent, unexpected power interruptions, which threaten the integrity of the information stored in the flash memory.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment of the present disclosure, fault-tolerance is achieved by preserving a transacted state of the file system, and performing writes to a working state representation of the file system instead of writing over the transacted state. When a transaction occurs, the working state becomes a new transacted state without overwriting the old transacted state, so that file system integrity can be maintained even in the event of a power failure during a write. Physical writes to a computer-readable medium are minimized by using a change list to keep track of which blocks in a file system tree have branched from a transacted state to a working state, instead of updating each parent block of the branched block. Physical writes to the computer-readable medium are further reduced by adding and removing key-value pairs to a delta block, instead of directly to the file system tree.

In another embodiment of the present disclosure, the file system tree is used to store a representation of storage units allocated to each file in the file system. This representation includes a representation of all of the unallocated storage units in the file system. A Q-Block is used to prevent cycles between adding and removing storage units from this portion of the file system tree.

In yet another embodiment of the present disclosure, file metadata is stored in the file system tree. The size of this tree and the number of queries required to find a given piece of file metadata are both minimized by storing only non-duplicative file metadata. For certain types of file metadata, any missing values in the file system tree may be inferred from the values stored within the tree, due to the nature of storing and retrieving information from the tree.

A system, computer-implemented method, and tangible computer-readable medium having computer-executable instructions stored thereon for storing and updating data are disclosed. The method includes storing, on a computer-readable storage medium, a plurality of logical nodes, each logical node including one or more key-value pairs; updating a first block of a logical node of the plurality of logical nodes by overwriting the first block of the updated logical node on the computer-readable storage medium; and modifying an entry in a change list to indicate that references to a second block of the updated logical node should be redirected to the first block of the updated logical node. The system is configured in a similar way. The instructions stored upon the tangible computer-readable medium, if executed by one or more processors of a computer system, cause the computer system to perform a similar method.

An electronic device for fault-tolerant storage of data is also disclosed. The device comprises one or more processors, and a storage medium readable by the one or more processors via a file system driver. The storage medium has stored thereon file system structures including a master block. The master block references a metaroot for storing file directory information and file allocation information, and a delta block for storing information concerning changes made to the information stored under the metaroot. The metaroot references a Q-Block for management of unallocated memory blocks.

A system, a tangible computer-readable medium having computer-executable instructions stored thereon, and a computer-implemented method for storing and retrieving file system information are disclosed, as well. The method comprises storing a plurality of key-value pairs in a data structure, wherein each key includes a unique file identifier and an offset value, and wherein the key-value pairs in the data structure are sorted according to the key; receiving a request for a key-value pair, the request including a requested key; and, when a key-value pair corresponding to the requested key cannot be found in the data structure, returning a key-value pair corresponding to a next highest key-value pair found in the data structure and inferring the value of the requested key-value pair based on the identity and value of the returned key-value pair. The system is configured to perform a similar method, and the computer-executable instructions stored on the tangible computer-readable medium cause a computer system to perform a similar method if executed by one or more processors of the computer system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A-3B illustrate a source of inefficiency in previous fault-tolerant file system trees;

FIGS. 9A-9C illustrate exemplary information stored in a directory tree of the structure shown in FIG. 2;

FIGS. 10A-10B and 11A-11B illustrate exemplary information stored in an allocation tree of the structure shown in FIG. 2;

DETAILED DESCRIPTION

Overview

Figure 1:
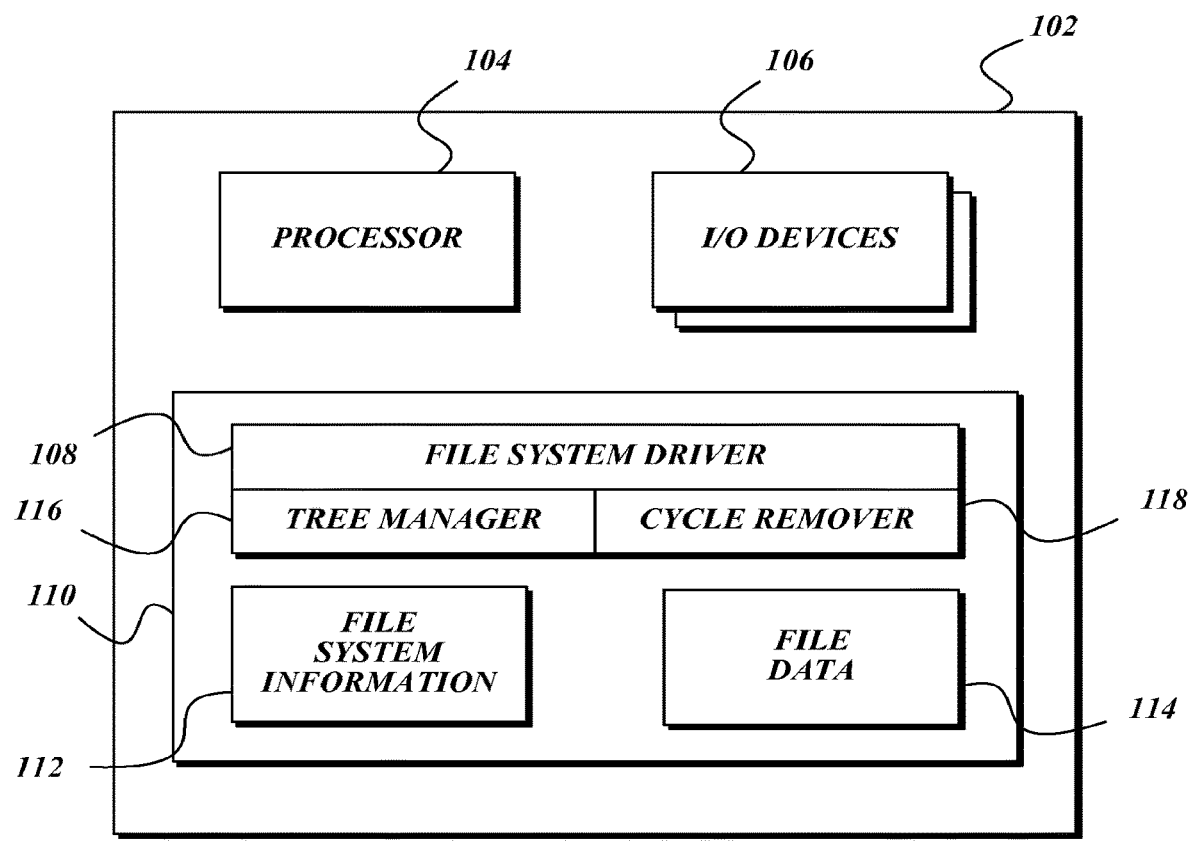
FIG. 1 is an overview block diagram of an exemplary electronic device incorporating a fault-tolerant file system according to various embodiments of the present disclosure.

FIG. 1 is an overview block diagram that illustrates an exemplary electronic device 102 incorporating a fault-tolerant file system according to various embodiments of the present disclosure. The exemplary electronic device 102 is a portable electronic device such as a cell phone, digital camera, personal digital assistant ("PDA"), or the like. Other examples of electronic devices and/or computing environments in which the present disclosure will likely be useful are a personal computer with removable storage media, as part of an embedded operating system, a stand-alone storage device, and the like. The exemplary electronic device 102 includes at least one processor 104, one or more input/output devices 106, and storage medium 110. The storage medium 110, which is readable by the processor 104 and the I/O devices 106, is accessed via a file system driver 108. In some embodiments, some of these components can be absent, or can be present in differing forms. For example, I/O devices 106 included in a cell phone can include keypads, trackballs, display screens, and the like. As another example, I/O devices 106 included in an embedded device can include environmental sensors and communication buses, or can be omitted completely.

The file system driver 108 provides an interface to file system information 112 and file data 114 stored on the storage medium 110. The file system driver 108 includes a tree manager 116 and a cycle remover 118, which perform functions relating to managing data structures that organize the file system information 112 and the file data 114. The tree manager 116, cycle remover 118, and their respective functions will be described in further detail below. Though a file system is primarily discussed herein, the disclosed embodiments may also be used to manage other types of data in volatile and non-volatile memory.

In the exemplary electronic device 102 shown in FIG. 1, the storage medium 110 is flash memory. However, in other electronic devices, the storage medium 110 may be some other type of tangible computer-readable storage medium, including but not limited to hard disk drives, floppy disk drives, optical drives (such as CD-R, CD-RW, DVD-R, DVD-RW, DVD-RAM, and writeable/rewritable BluRay drives), RAM, cache memory, and the like. Preferably, the actions described below are implemented as computer-executable instructions stored on a tangible computer-readable medium, wherein the instructions, when executed by a processor, cause the system containing the processor to perform the described actions. Preferably, the file system driver 108 is stored on the storage medium 110 and loaded at mount time. Alternatively, the file system driver 108 may be located on a different storage medium, may be provided in specially programmed hardware, or provided in other ways known in the art.

Figure 2:
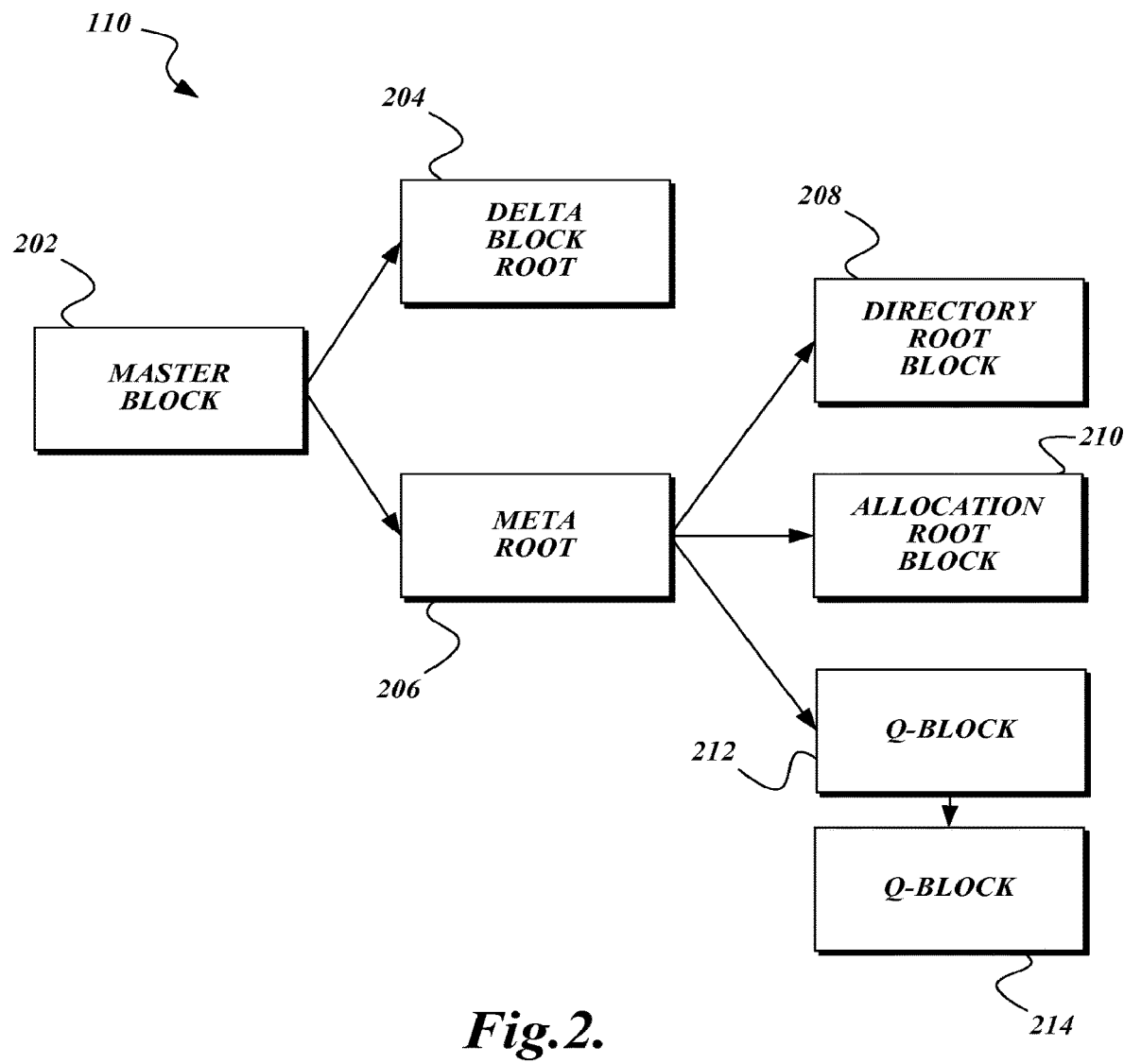
FIG. 2 is an overview block diagram of a structure for storing file system information in a fault-tolerant file system according to various embodiments of the present disclosure.

FIG. 2 depicts an overview of exemplary structures for storing file system information 112 in a fault-tolerant manner in a flash memory. A master block 202 contains pointers to a delta block 204 and a metaroot block 206. The master block 202 is located in a known location on the storage medium 110, and is loaded by the file system driver 108 at mount time. The metaroot 206 points to a directory root block 208, an allocation root block 210, and a Q-Block 212. The Q-Block 212 can, in turn, point to a list of one or more additional Q-Blocks 214. Each of these structures will be further described below.

The directory root block 208 is the root of a tree of blocks that collectively store information about a file structure, such as directory paths, file names, and the like. The allocation root block 210 is the root of a tree of blocks that collectively store file data. This file data includes file metadata such as creation date/time, permissions, and the like. The file data also includes file allocation data such as the location of blocks on the storage medium that are allocated to the file. The data in each of these trees is stored in leaf nodes, and the tree may contain one or more levels of intermediate nodes between the leaf nodes and the directory root block 208 or allocation root block 210.

While, for sake of clarity, only one of each type of block is depicted in FIG. 2, in one actual embodiment, each of the depicted structures other than the master block 202 is stored as a pair of blocks: a transacted state block and a working state block. For example, the metaroot 206 is represented on the storage medium 110 as a transacted state meta root and a working state meta root. When a change is made to the metaroot 206, the working state meta root is overwritten with the new information and a transaction counter is incremented. This operation, known as "branching" the block, helps to ensure that the data stored on the storage medium is consistent even if a write is interrupted. This technique is further described in U.S. Pat. No. 7,284,101, which is incorporated hereby in its entirety by reference.

Depending on implementation, if desired, any block described herein may be formed by a pair of blocks. More specifically, any block described herein can be represented by a transacted state block that has been committed to the storage medium as part of a file system transaction. When such a block is allocated, an unused block is also allocated. If the transacted state block is branched, the unused block is turned into a working state block, which becomes the currently active block with regard to the rest of the file system. The transacted state block retains the last-known-good version of the data in the block, which is read and copied into the unused block before editing to initialize the working state block. This allows the working state block to be edited multiple times without fear of corrupting the file system. When a file system transaction is initiated and completed, the working state block is designated as the transacted state block, and the previous transacted state block becomes unused (but ready to become a working state block). For ease of discussion, the below description sometimes omits references to pairs of blocks, rather referring to single blocks However, it is to be understood that pairs of blocks are contemplated in each such case as also included as part of this disclosure.

Fault-Tolerant Trees

When storing tree data in a structure having transacted state blocks and working state blocks, certain inefficiencies may arise when attempting to update data in the tree. One such inefficiency is depicted in FIGS. 3A and 3B. FIG. 3A illustrates a fault-tolerant tree 300 before performing a write. In the tree 300, each logical node is represented by two physical blocks of the storage medium. For example, logical root node 302 is represented by a first block 304 which includes a key value 305, a first pointer 312, and a second pointer 314. Logical root node 302 also includes a second block 310, which is illustrated partially hidden behind the first block 304 to indicate that the first block 304 is the most recently updated block of the pair, and is therefore the currently active block. The second block 310 is also configured to contain a key 309, a first pointer 307, and a second pointer 306, but since the first block 304 is the currently active block, these fields in the second block 310 initially do not contain useful data, and have no effect on the traversal of the tree.

For ease of discussion, blocks in the illustrated tree are referred to below interchangeably by either an element number or by a block number 304, 310. For example, in FIG. 3A, "block number 1" refers to the first block 304, and "block number 2" refers to the second block 310. The block number uniquely identifies a block made up of a group of one or more sectors on the storage medium, and is used below as a simplified identifier to refer to the given block. Further, though the blocks and block numbers discussed herein contemplate reading from and writing to locations on a nonvolatile storage medium, this should not be construed as limiting. In one embodiment, both transacted state blocks and working state blocks are stored in a volatile memory. In another embodiment, transacted state blocks are stored in a nonvolatile memory and working state blocks are stored in a volatile memory, or vice versa. In yet another embodiment, transacted state blocks and working state blocks are read from nonvolatile memory, stored and manipulated in volatile memory, and then written to nonvolatile memory.

As in a traditional tree data structure, the key of each node in the tree, such as the key 305 of the first block 304, is used by a process looking for information in the tree to determine which of the outbound pointers, such as the first pointer 312 or the second pointer 314, to traverse to find the information. In the illustrated example, the key is considered greater than or equal to all data values in blocks referred to by the first pointer, and less than all data values in blocks referred to by the second pointer. While, in order to simplify the drawings, only one key and two pointers are illustrated, those skilled in the art will recognize that other embodiments may have more than one key per node, and consequently more than two outbound pointers. For example, in an embodiment with two keys and three pointers, a first key would be greater than or equal to all data values referred to by a first pointer, a second key would be greater than or equal to all data values referred to by a second pointer, and a third pointer would refer to data values greater than the second key, and so on. This holds true for each embodiment of the tree structure illustrated and described herein.

Returning to the contents of the logical root node 302, block 1 contains a key value of "N," meaning that each data value pointed to by the children of the first pointer 312 is smaller than or equal to "N," and each data value pointed to by the children of the second pointer 314 is greater than "N." This is also true for the two intermediate nodes 316 and 318. Nodes 320, 332, 334, and 336 are leaf nodes which contain data values. As with the above-described intermediate nodes, some embodiments of leaf nodes may contain more than two data values, but have been depicted here as containing two data values for simplicity. A leaf node, such as leaf node 320, is represented by a first block 326 (block 7) and a second block 328 (block 8). The first block 326 includes a first key 322 and a second key 324. The second block 328 also includes a first key 331 and a second key 330. The keys in the leaf nodes are each associated with data values, but the data values have not been depicted in these figures for the sake of simplicity.

The pointers in the tree 300 track which logical nodes are the children of a given node, and also help track which block of a logical node is the current block. In this way, the current blocks never need be overwritten to update the tree Instead, the working state blocks can be updated, and can even be written to the storage medium, and can only be referred to as the new current block by a parent node once a transaction is complete. This technique is further described in incorporated U.S. Pat. No. 7,284,101.

To demonstrate how the tree 300 is used to retrieve data, consider a situation when a tree manager 116 (FIG. 1) receives a request for data associated with the key "R." The tree manager 116 consults the logical root node 302, and finds that the key 305 of the currently active block (block 1) is less than "U." The tree manager 116 therefore traverses the second pointer 314, which refers to block 5. The tree manager 116 then consults the key of block 5, finds that the key is greater than "R," and therefore traverses the first pointer of block 5, which refers to block 11. The tree manager 116 would then search block 11, find the key "R," and return the associated data value.

FIG. 3B illustrates an inefficiency involved in performing a write to one of the leaf nodes in the fault-tolerant tree 300 described above. The tree manager 116 updates logical node 320a to replace the key "D" with the key "C." To do this, logical node 320a branches block 7 to block 8, making block 8 the currently active block and updating the first key 331a of block 8. This allows the logical node 320a to be updated without overwriting block 7. However, any parent node which pointed to block 7 must now be updated to point to block 8 instead, as block 8 is now the currently active block. Accordingly, the tree manager 116 branches logical node 316a from block 3 to block 4, and updates the first pointer to point to block 8 (which had previously pointed to block 7). Again, this allows the logical node 316a to be updated without overwriting block 3, but requires updating any parent node which points to block 3 to point to block 4. Hence, the tree manager 116 branches logical node 302a from block 1 to block 2, and updates the first pointer 307a to point to block 4 (which had previously pointed to block 3).

As can be seen, updating one leaf node in a fault-tolerant tree leads to the requirement that at least one additional node be updated for each level of the tree. In cases such as that depicted in FIG. 3B, where a block is the unit of writing to the storage medium, two additional block writes would be performed for each block write that updates a leaf node. As the tree grows in size, even more additional block writes are required. Because a block write can be an expensive operation, the level of fault tolerance gained by using a fault-tolerant tree 300 may not outweigh the performance decrease resulting from performing these additional block write operations.

Using a Change List to Update a Fault-Tolerant Tree

Figure 4A:
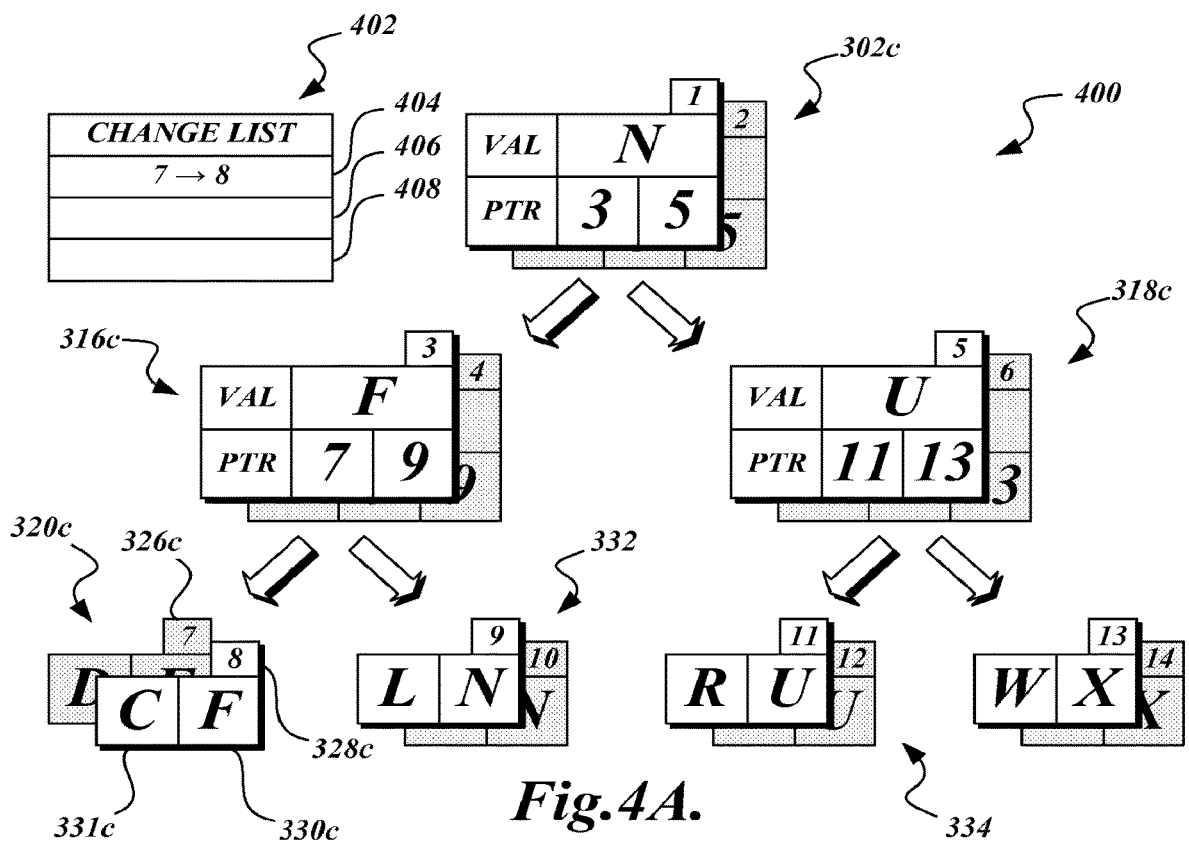
FIGS. 4A-4D illustrate the use of a change list to improve the efficiency of fault-tolerant file system trees according to various embodiments of the present disclosure.

FIG. 4A illustrates an exemplary structure which allows the number of block writes to be minimized when updating a leaf node in a fault-tolerant tree 400. The fault-tolerant tree 400 begins in a state similar to that shown in FIG. 3A. Also, similar to the FIG. 3B example described above, the tree manager 116 (FIG. 1) updates logical node 320c to replace the key "D" with the key "C" by branching block 7 to block 8, and by updating the first key 331c of block 8. Instead of propagating this change to the parent nodes of leaf node 320c, however, the change is recorded in a change list 402.

The change list 402 is consulted when traversing the fault-tolerant tree 400 to translate old pointers into new pointers for nodes that have been updated. In the illustrated example, when block 7 is branched to block 8, a change list entry 404 is created. The change list entry 404 contains a reference to block 7 as an old pointer, and a reference to block 8 as a new pointer. Subsequently, when the tree manager 116 is traversing the tree 400 to find a key, the tree manager 116 consults the change list 402 before following a pointer to determine if an old pointer should be translated into a new pointer.

For example, in the updated tree 400 of FIG. 4A, the tree manager 116 would find key "C" as follows. First, the tree manager 116 compares the key "N" of block 1 to the desired key "C," and determines that "C" is less than "N." Accordingly, the tree manager 116 chooses the first pointer of block 1, which points to block 3. Before traversing this pointer, the tree manager 116 checks the change list 402 to see if there is an entry that identifies block 3 as an old pointer. Since no such entry exists, the tree manager 116 traverses the pointer to block 3, and compares the key "F" of block 3 to the desired key "C." The tree manager 116 determines that the desired key "C" is less than the key "F" of block 3. Accordingly, the tree manager 116 chooses the first pointer of block 3, which points to block 7. Before traversing this pointer, the tree manager 116 again checks the change list 402 to see if there is an entry that identifies block 7 as an old pointer. This time, the tree manager 116 finds change list entry 404. Instead of traversing the pointer to block 7, the tree manager 116 traverses the pointer to block 8 based on the translation stored in the change list entry 404. The tree manager 116 then searches block 8 for the desired key "C," and finds the desired entry 331c.

As can be seen, the use of a change list can dramatically reduce the number of writes required to update a leaf node during a transaction in the fault-tolerant tree 300. The example described above with respect to FIG. 3B required at least four block writes to update a leaf node: three block writes for the blocks of the fault-tolerant tree 300, and one block write for the metaroot (which is updated during each transaction). This number of writes increases with each level of a tree as a tree grows in size. In contrast, updating a leaf node of the fault-tolerant tree 400 of FIG. 4A uses three block writes: one for the metaroot, one for the leaf node itself, and one for the updated change list 402. In another embodiment, the number of writes can be reduced further by storing the change list 402 in the same block as the metaroot or as part of the metaroot, since the metaroot is written during each transaction regardless of how many other blocks have changed. In this embodiment, the number of block writes performed for a transaction that updates a leaf node is reduced to two. As a further advantage, this number of writes does not change as the size of the tree increases. That is, even if additional levels are added to a fault-tolerant tree, updating a leaf node using a change list will still only require two block writes.

The exemplary change list 402 shown in FIG. 4A includes three spaces 404, 406, 408 for storing change list entries. Obviously, other embodiments may have more or fewer spaces for storing change list entries. As seen in FIG. 4A, creating the change list entry 404 when branching block 7 to block 8 consumes one of these spaces. As a further example, in FIG. 4B, block 11 has been branched to block 12 in order to update key "L" to key "M," and block 9 has subsequently been branched to block 10 in order to update key "U" to key "T." Accordingly, two more change list entries have been stored in the change list 402a shown in FIG. 4B: an entry 406 with a pointer referencing block 11 as the old pointer and a pointer referencing block 12 as the new pointer, and an entry 408 with a pointer referencing block 9 as the old pointer and a pointer referencing block 10 as the new pointer. At this point, the change list 402a is full, and entries must be removed if further blocks from the fault-tolerant tree 400a are to be branched.

Figure 5A:
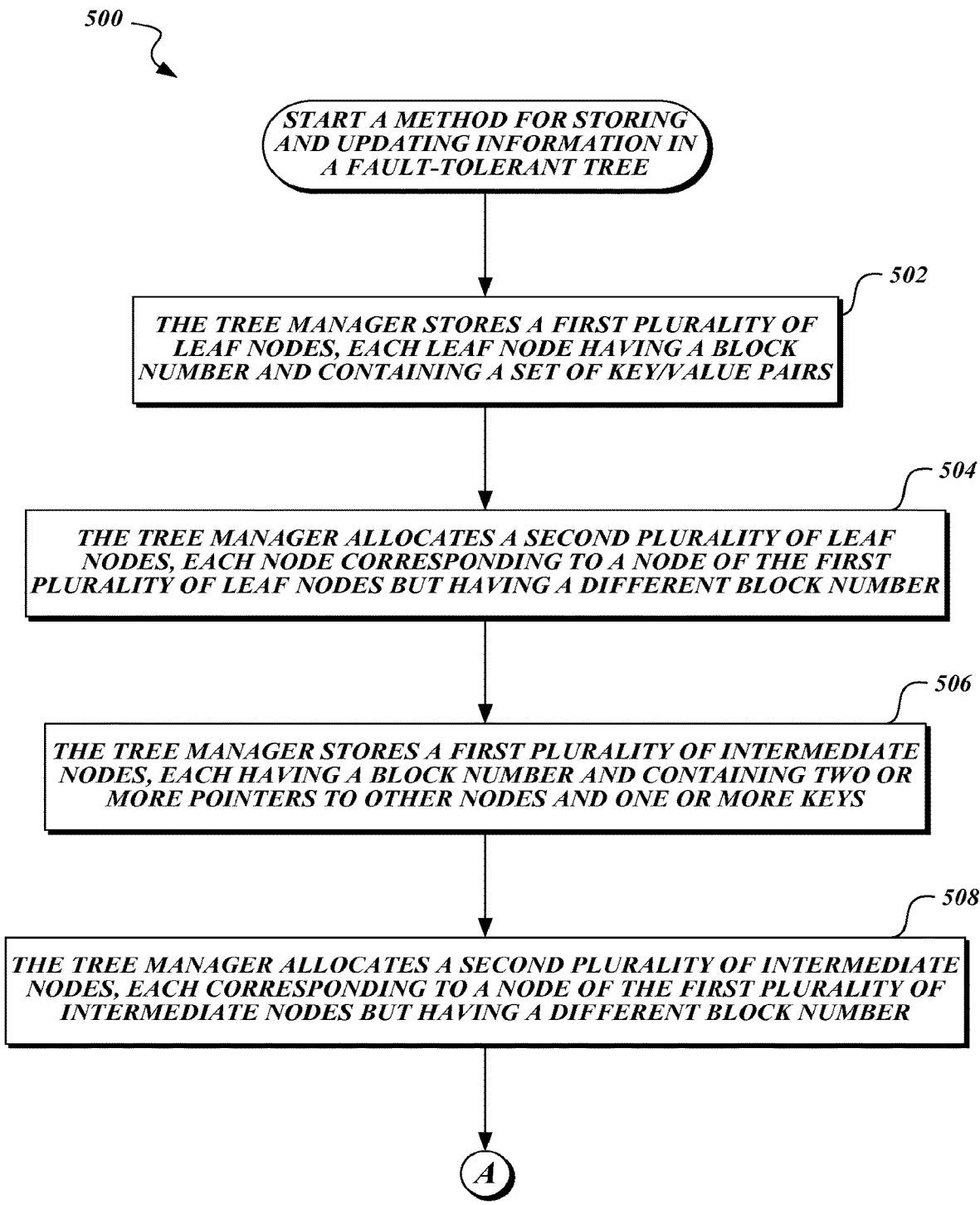
FIGS. 5A-5B illustrate a method for storing and updating information in a fault-tolerant tree according to various embodiments of the present disclosure.
Figure 5B:
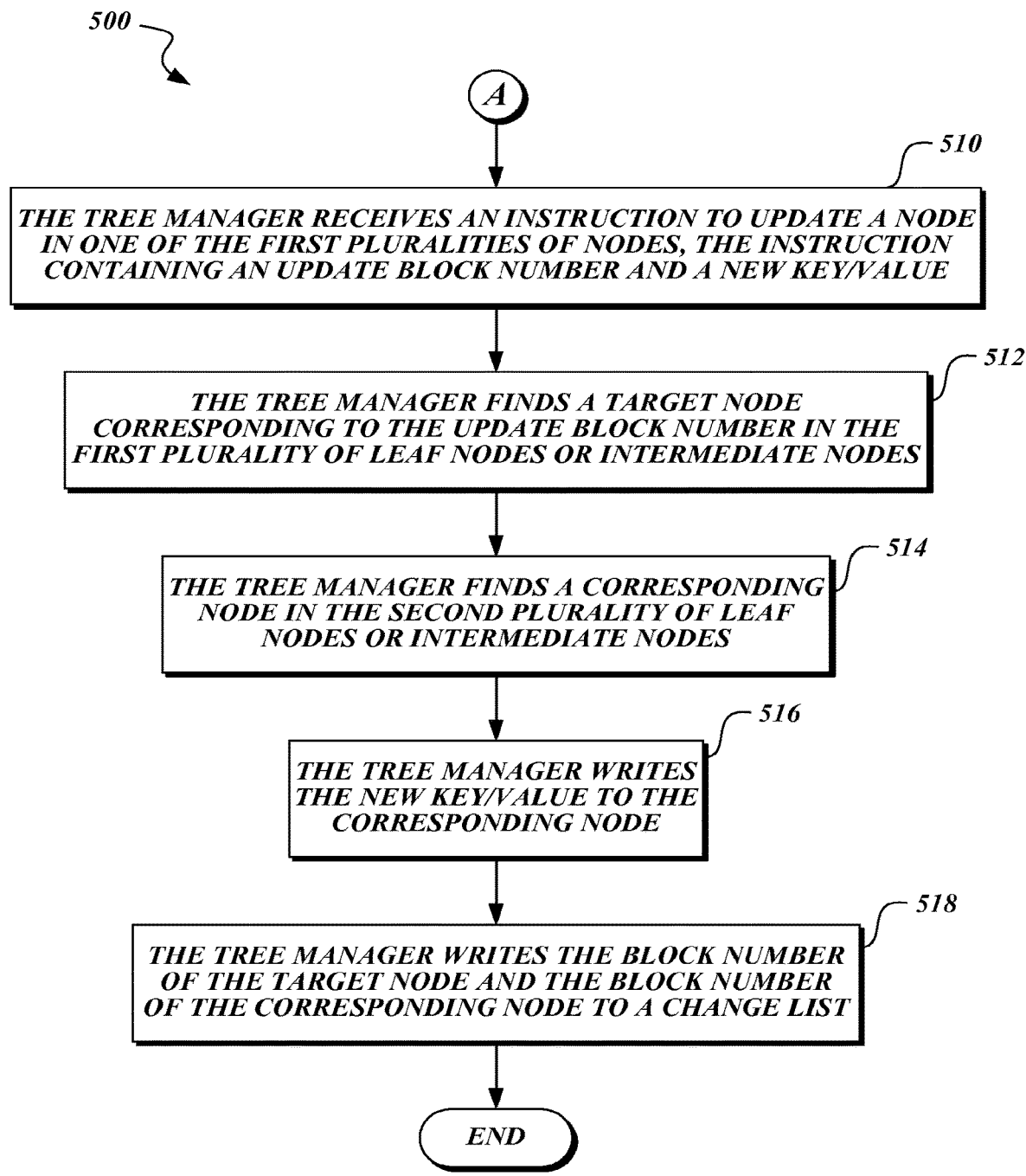

FIGS. 5A-5B illustrate a method 500 for storing and updating information in a fault-tolerant tree. From a start block, the method 500 proceeds to block 502, where the tree manager 116 stores a first plurality of leaf nodes, each leaf node having a block number and containing a set of key-value pairs. Next, at block 504, the tree manager 116 allocates a second plurality of leaf nodes, each node corresponding to a node of the first plurality of leaf nodes but having a different block number. The method 500 then proceeds to block 506, where the tree manager 116 stores a first plurality of intermediate nodes, each having a block number and containing two or more pointers to other nodes and one or more keys. Next, in block 508, the tree manager 116 allocates a second plurality of intermediate nodes, each corresponding to a node of the first plurality of intermediate nodes but having a different block number. The method 500 then proceeds to a continuation terminal ("terminal A").

From terminal A (FIG. 5B), the method 500 proceeds to block 510, where the tree manager 116 receives an instruction to update a node in one of the first plurality of nodes, the instruction containing an update block number and a new key. Next, at block 512, the tree manager 116 finds a target node corresponding to the update block number in the first plurality of leaf nodes or intermediate nodes. The method 500 then proceeds to block 514, where the tree manager 116 finds a corresponding node in the second plurality of leaf nodes or intermediate nodes. Next, at block 516, the tree manager 116 writes the new key to the corresponding node. The method 500 then proceeds to block 518, where the tree manager 116 writes the block number of the target node and the block number of the corresponding node to a change list. The method 500 then proceeds to an end block and terminates.

Figure 4B:
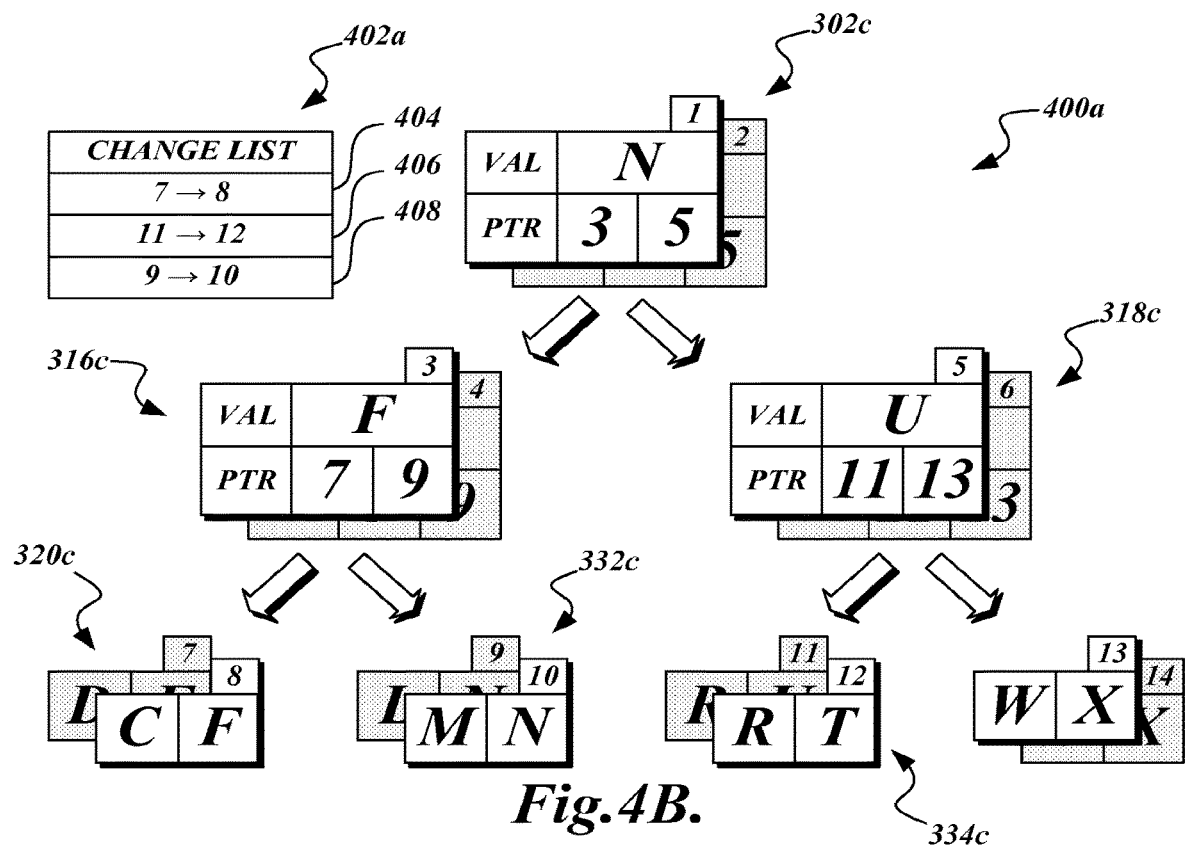
Figure 4C:
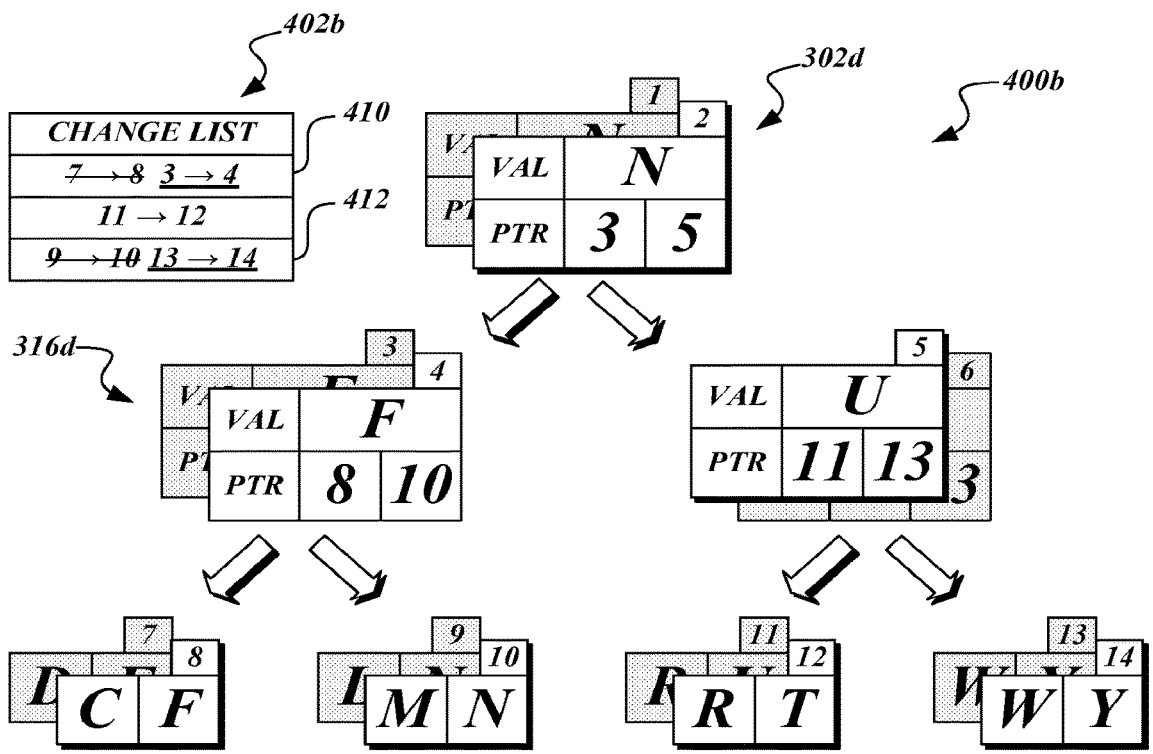

FIG. 4C shows an example of what happens in an exemplary embodiment when a tree manager 116 receives a request to branch block 13 to block 14, starting with a fault-tolerant tree 400a and a filled change list 402a such as those illustrated in FIG. 4B. First, the tree manager 116 must choose an entry to remove from the change list 402b to make room for the new entry. One way for the tree manager 116 to choose an entry is to remove the oldest entry. In this case, the entry for branching block 7 to block 8 is the oldest, so it is removed from the list (as indicated in strikethrough in FIG. 4C).

Since this entry will no longer be in the change list 402b, the tree 400b is updated to contain the new keys that were previously tracked in the change list 402b. The tree manager 116 traverses the tree to find a parent node that contains a pointer to the old block (block 7) and needs to be updated to instead point to the new block (block 8). One way the tree manager 116 might do this is by selecting a key from the leaf node (such as "F"), and then traversing the tree 400b starting from the logical root node until the parent 316d of that node is found.

Once found, the tree manager 116 searches the parent node 316d to find any other pointers that are also in the change list. In this example, the tree manager 116 also found that the parent node 316d contained a pointer to block 9, which had been branched to block 10. The change list entries for these additional pointers are also removed from the change list 402b. The tree manager 116 then branches the parent node, adding an entry 410 to the change list 402b to record the branching, and changing the old pointer to the new pointer in the branched parent block for each pointer that matches a removed change list entry. In the example, block 3 has been branched to block 4, and updated to point to block 8 instead of block 7 and block 10 instead of block 9. Finally, an entry 412 for the originally requested branched block (branching block 13 to block 14) is inserted into the change list 402b.

Figure 4D:
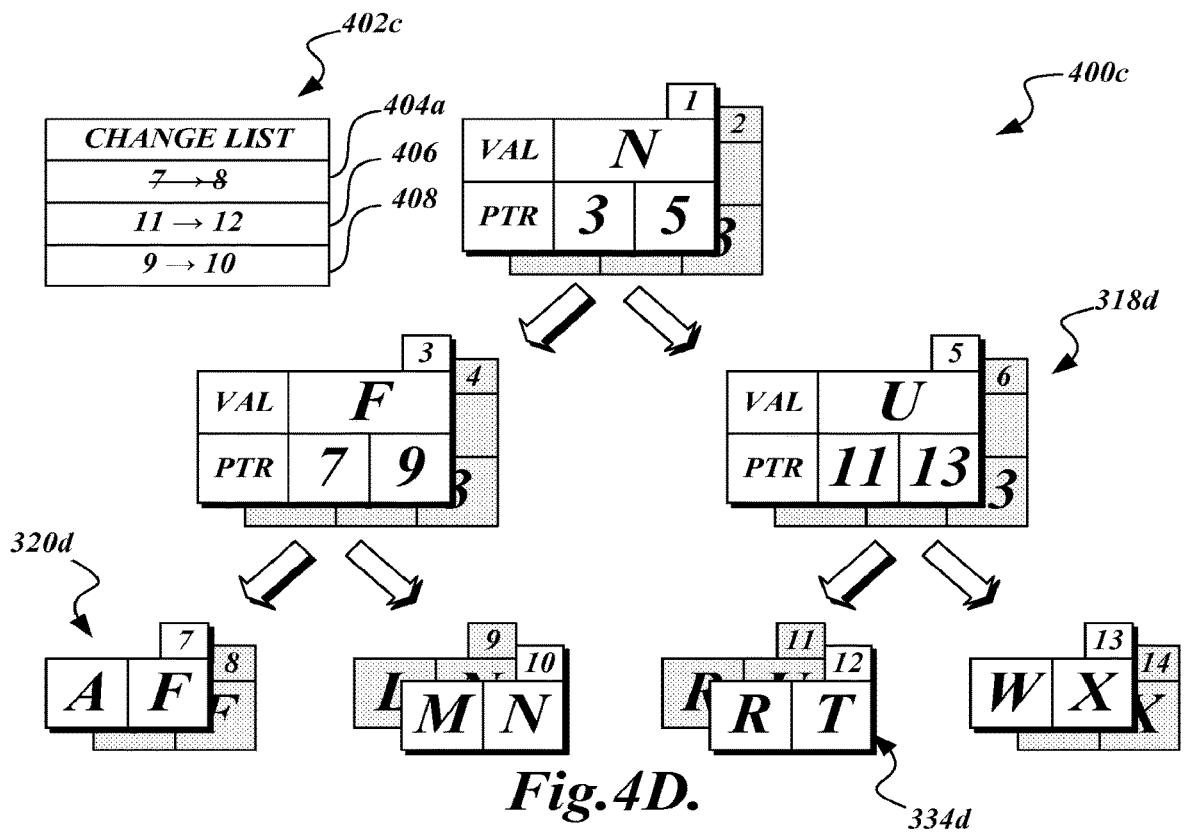

In some situations, further efficiencies may be gained. For example, FIG. 4D illustrates a situation where, starting with the tree 400a and change list 402a of FIG. 4B, the tree manager 116 receives a request to update leaf node 320d to change key "C" to key "A," and thereby branch block 8 back to block 7. This example assumes that the tree 400a is in a transacted state, as a given block is only branched once per transaction. After branching to a working state block, any subsequent changes during the same transaction are made to the same working state block without branching again. To review, after the transaction, the previous working state block is now a transacted state block, the previous transacted state block is unused, and the change list contains an entry indicating that references to the previous transacted state block (which is now unused) are redirected to the new transacted state block (which was previously the working state block).

To branch block 8 back to block 7, since an entry 404a already exists in the change list 402c with block 7 as the old pointer and block 8 as the new pointer, the tree manager 116 does not need to create another change list entry. Instead, the tree manager 116 copies the contents of block 8 to block 7 to create a working state block out of block 7, and removes the previous entry 404a to indicate that block 7 is once again the currently active block.

In other situations, more than one of the oldest change list entries may need to be selected and removed before processing a new request to branch a block. For example, in the situation illustrated in FIG. 4C, if block 3 had not contained multiple updated keys, branching block 3 to block 4 would have caused the change list to become full again, and the next oldest entry would have to be removed. Despite the need to perform the process again, it will eventually terminate when the changes either propagate high enough up the tree, or a previously branched node is branched back to its original version.

Figure 6A:
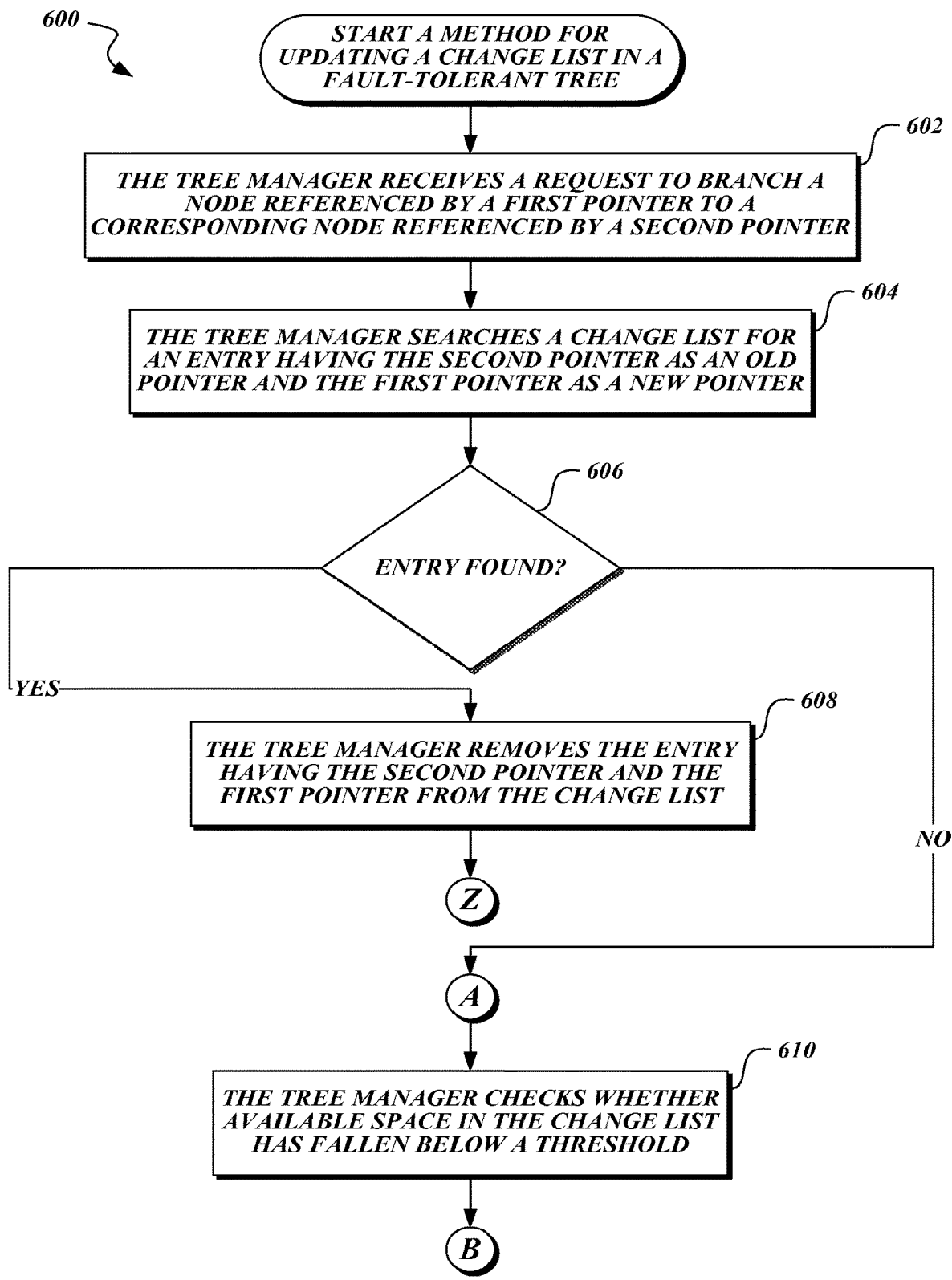
FIGS. 6A-6C illustrate a method for updating a change list in a fault-tolerant file system tree according to various embodiments of the present disclosure.
Figure 6B:
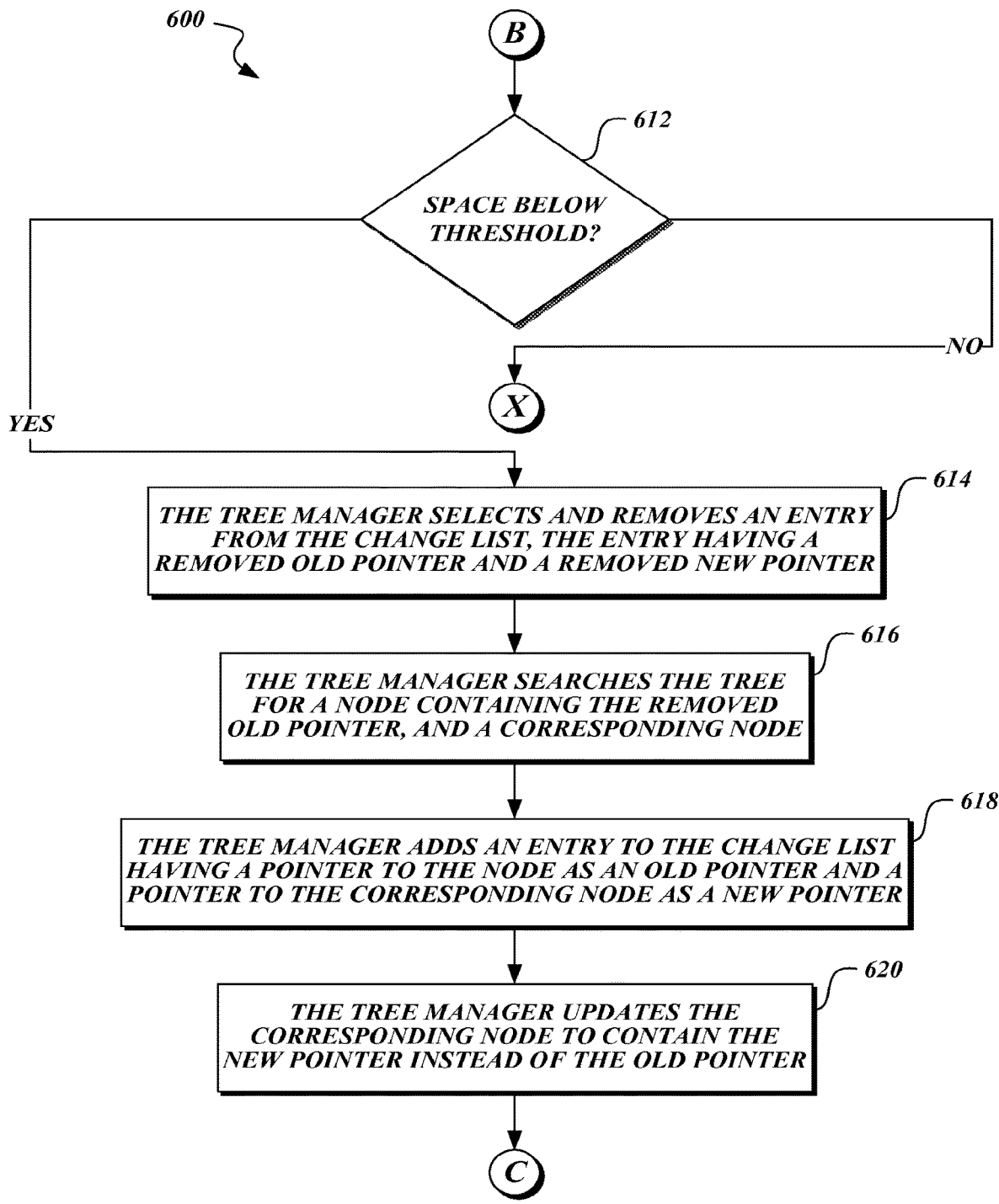
Figure 6C:
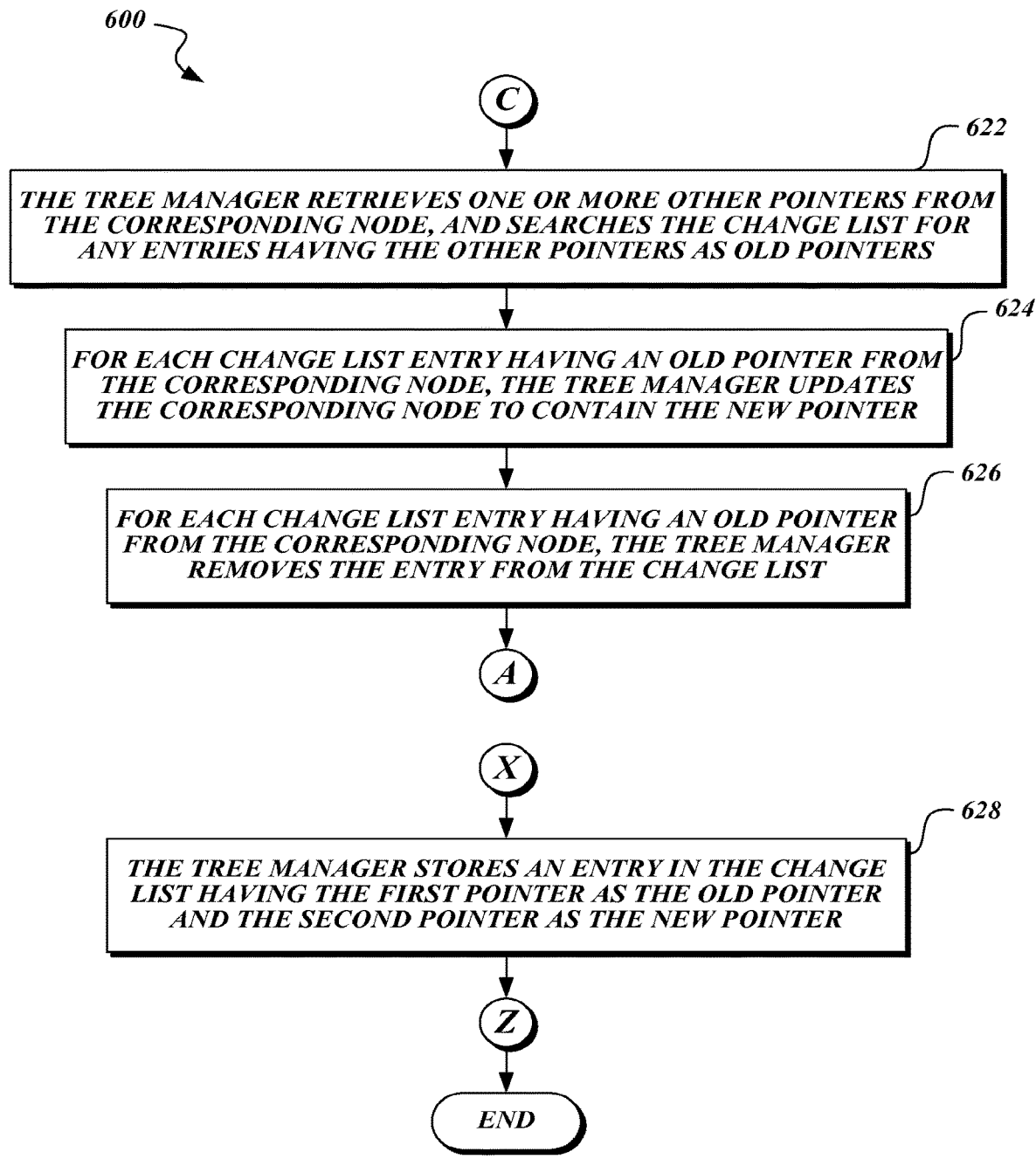

FIGS. 6A-6C illustrate an exemplary embodiment of a method 600 for updating a change list 402 in a fault-tolerant tree 400. From a start block, the method 600 proceeds to block 602, where the tree manager 116 receives a request to branch a node referenced by a first pointer to a corresponding node referenced by a second pointer. Next, at block 604, the tree manager 116 searches a change list 402 for an entry having the second pointer as an old pointer and the first pointer as a new pointer. The method 600 then proceeds to decision block 606, where a test is performed to determine whether such an entry was found. If the answer to the test at decision block 606 is YES, the method proceeds to block 608, where the tree manager 116 removes the entry having the second pointer and the first pointer from the change list 402. The method then proceeds to a continuation terminal ("terminal Z"). Otherwise, if the answer to the test at decision block 606 is NO, the method 600 proceeds to a continuation terminal ("terminal A"), and then to block 610, where the tree manager 116 checks whether available space in the change list 402 has fallen below a threshold. In the embodiment described above, the threshold was whether there was any room at all in the change list 402, but other embodiments can use a higher threshold. The method 600 then proceeds to another continuation terminal ("terminal B").

From terminal B (FIG. 6B), the method 600 proceeds to a decision block 612, where a test is performed to determine whether the space available in the change list 402 is below the threshold. If the answer to the test at decision block 612 is NO, the method 600 proceeds to a continuation terminal ("terminal X"). Otherwise, if the answer to the test at decision block 612 is YES, the method 600 proceeds to block 614, where the tree manager 116 selects and removes an entry from the change list 402, the entry having a removed old pointer and a removed new pointer. Next, at block 616, the tree manager 116 searches the tree for a node containing the removed old pointer, and a corresponding node. The method 600 then proceeds to block 618, where the tree manager 116 adds an entry to the change list 402 having a pointer to the node as an old pointer and a pointer to the corresponding node as a new pointer. Next, at block 620, the tree manager 116 updates the corresponding node to contain the new pointer instead of the old pointer. The method 600 then proceeds to another continuation terminal ("terminal C").

From terminal C (FIG. 6C), the method 600 proceeds to block 622, where the tree manager 116 retrieves one or more other pointers from the corresponding node, and searches the change list 402 for any entries having the other pointers as old pointers. Next, at block 624, for each change list entry having an old pointer from the corresponding node, the tree manager 116 updates the corresponding node to contain the new pointer. The method 600 then proceeds to block 626, where, for each change list entry having an old pointer from the corresponding node, the tree manager 116 removes the entry from the change list 402. The method 600 then proceeds to terminal A (see FIG. 6A).

The method 600 reaches terminal X (FIG. 6C) when space available in the change list 402 meets a threshold (see FIG. 6B). From terminal X, the method 600 proceeds to block 628, where the tree manager 116 stores an entry in the change list 402 having the first pointer as the old pointer and the second pointer as the new pointer. Next, the method 600 proceeds to terminal Z. The method 600 then continues from terminal Z to an end block, and terminates.

Using a Delta Block to Update a Fault-Tolerant Tree

As stated above, using a change list can greatly reduce the number of blocks that must be branched in order to update a leaf node in a fault-tolerant tree. No more than two blocks should need to be branched when the change list contains available space: the block containing the metaroot (which contains the change list), and the block of the leaf node to be updated. In one embodiment, a delta block is used to even further reduce the number of blocks that must be branched to update a leaf node.

Figure 7:
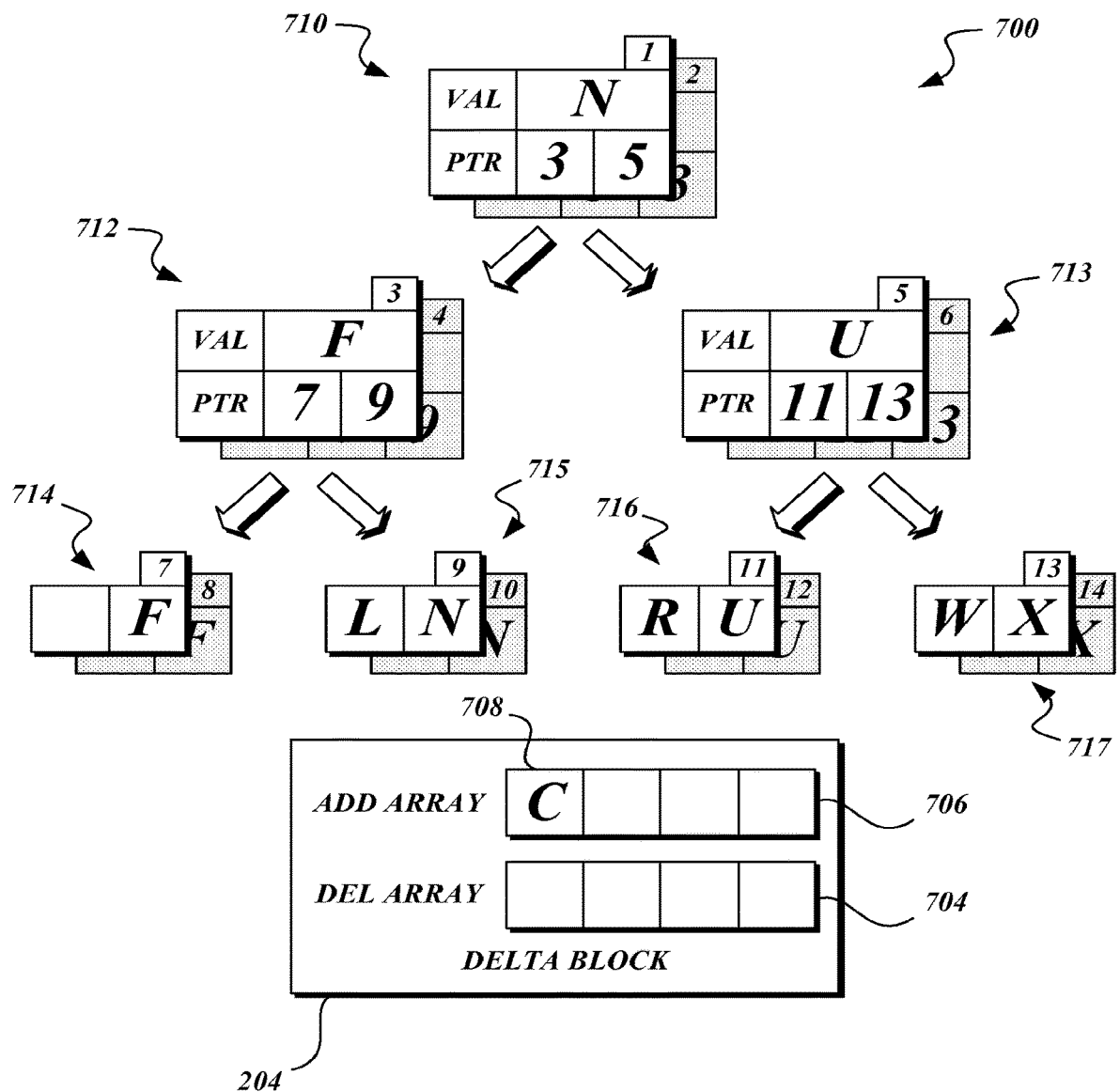
FIG. 7 illustrates adding information to a fault-tolerant file system tree using a delta block, according to various embodiments of the present disclosure.

FIG. 7 illustrates an embodiment of a fault-tolerant tree 700 that uses a delta block 204 to reduce the number of blocks branched when updating the tree 700. The tree 700 is similar to the trees in previous figures, with a root node 710, intermediate nodes 712 and 713, and leaf nodes 714, 715, 716, and 717. One difference is that one of the leaf nodes 714 is illustrated as storing only a single key, "F." Since the leaf nodes of the illustrated tree 700 are capable of storing two keys each, this means that there is room in the leaf node 714 to add an additional key.

If the tree manager 116 of the previously discussed embodiments receives a request to add value "C" to the tree 700, block 7 would be branched to block 8, and block 8 would be edited to include the key "C." Also, an entry would be created in the change list 402 of the previously described embodiments to indicate that block 7 has branched to block 8, causing the block containing the change list 402 to branch as well, for a total of two block branches. In a more complex scenario, if leaf node 714 was full upon the request to add key "C," leaf node 714 would need to be split, which could cascade up the tree 700 if each parent node is also full. This would require two new blocks to be allocated for each node that must be split, which could end up requiring up to 2+2N new blocks to be allocated in order to add the key "C," where N is the depth of the tree (2 blocks for a new leaf node, and two new blocks for each level of the tree).

Figure 8:
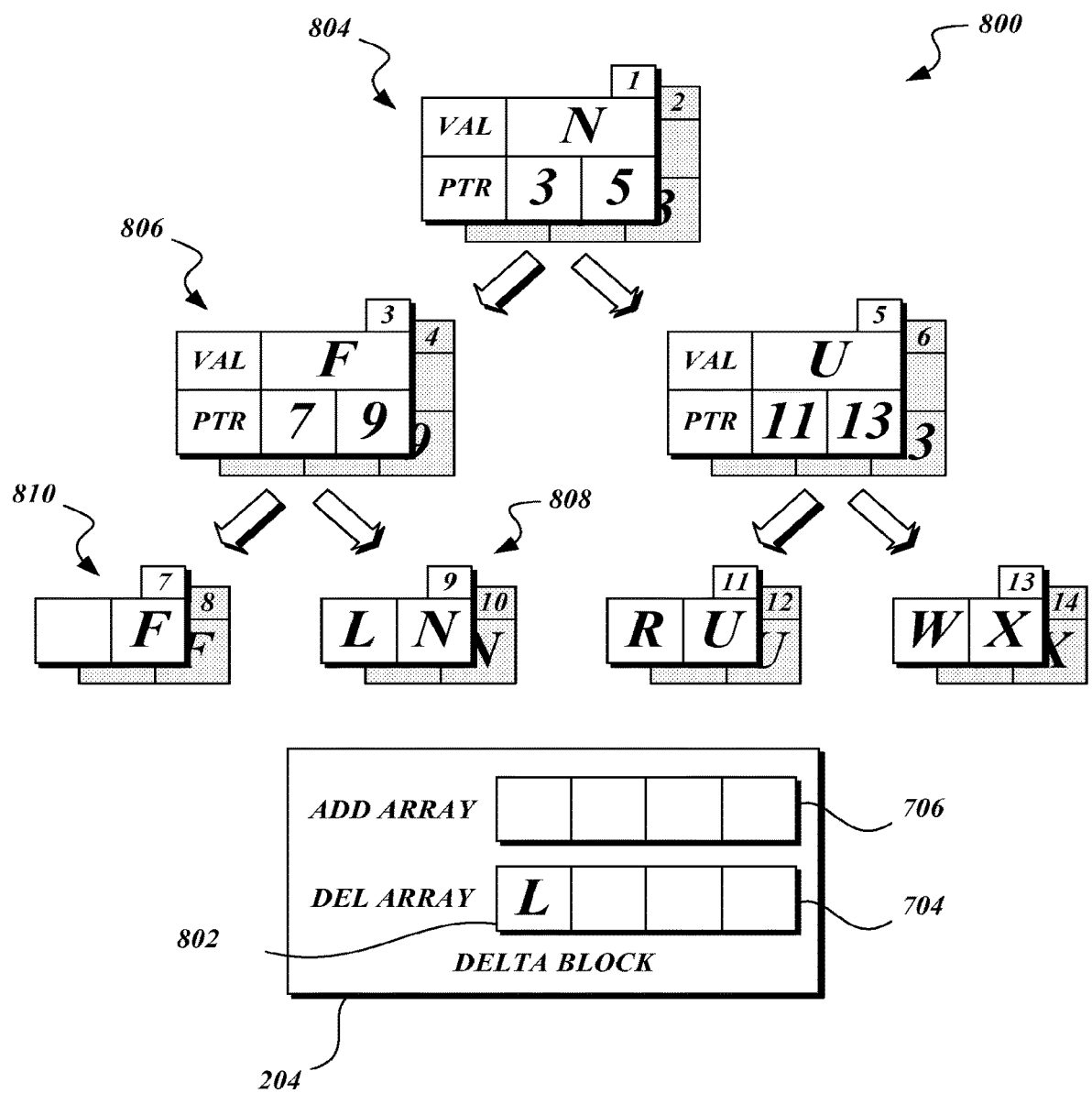
FIG. 8 illustrates removing information from a fault-tolerant file system tree using a delta block, according to various embodiments of the present disclosure.

Removing values from the fault-tolerant tree can lead to similar issues. Turning to FIG. 8, removing key "L" from the tree 800 would normally cause, at best, two nodes to branch: leaf node 808 would branch from block 9 to block 10, and the change list 402 would branch to add a change list entry for blocks 9 and 10. In an embodiment where the tree 800 is optimized to conserve space, this removal may cause leaf nodes 808 and 810 to merge, thus causing even further block branching.

As shown in FIG. 7, delta block 204 includes an add array 706 and a delete array 704 for storing transactions to be performed on the tree 800. Writing new key-value pairs to the delta block 702 instead of directly to the tree 700 drastically reduces the number of writes, and in many cases, allows an add to occur by branching only the block holding the delta block 702. For example, in FIG. 7, key "C" has been logically added to the tree 700 by adding an entry 708 having the key "C" to the add array 706 of the delta block 204.

Similarly, as shown in FIG. 8, writing key-value pairs to the delta block 204 to indicate removal from the tree 800 instead of actually removing those key-value pairs from the tree 800 can also reduce the number of writes to a single write in many situations. Key "L" has been removed from the tree 800 by adding an entry 802 having the key "L" to the delete array 704 of the delta block 204.

To give effect to the entries in the delta block 204, the tree manager 116 consults the delta block 204 when looking up values in the tree 700. For example, if the tree manager 116 is searching for a value "X," it first traverses the tree 700 to see if the key is stored in the tree 700. If the key is found, the tree manager 116 checks the delta block 204 to determine if the key is in the delete array 704. If the key is not found in the tree 700 or if it is found in the delete array 704, the tree manager 116 checks the add array 706 for the key. If the key was found in the tree 700 (assuming it was not found in the delete array 704) or in the add array 706, the value is returned. Otherwise, an error is indicated.

In one embodiment, the delta block 204 is configured to be transacted on its own. That is, an entire transaction can occur just by writing the delta block 204 to the storage medium, and no changes are made to any tree nodes, Q-Blocks, or metaroots. So long as space remains in the delta block 204, any changes to the tree nodes, Q-Blocks, and metaroots can be deferred by queuing the changes in the delta block 204 in this way. Once the delta block 204 becomes full, the changes from the delta block 204 are flushed into the other data structures, and a metaroot transaction is performed. One benefit of this embodiment is that, while a given tree node may change multiple times during multiple transactions, these multiple changes can be combined into a single metaroot transaction by queuing them in the delta block 204.

In this embodiment, the delta block 204 is stored separately from the metaroot block. The delta block 204 includes a transaction number which is incremented during each delta block transaction. The metaroot block includes a field indicating the transaction number stored in the last written delta block. In this way, if the transaction number stored by the delta block 204 is different from the transaction number indicated by the metaroot block, then it can be determined that changes have been made in the delta block 204 after the last metaroot transaction, and the add array and delete array of the delta block 204 should be consulted when traversing the tree.

Directory Tree Contents

As in FIG. 2 and described above, the metaroot 206 contains pointers to the roots of two trees: a directory root block 208 and an allocation root block 210. Each of these trees stores, in their respective leaf nodes, a collection of key-value pairs that organize and store the data within the respective trees. FIG. 9A illustrates an exemplary specification 900 of a key in the directory tree. The directory tree stores information such as file and directory names, and the associations between files and directory paths. Each key in the directory tree is a unique combination that includes a parent file number 902, a cyclic redundancy check ("CRC") value 904, a duplicate count 906, and a sequence number 908. The sizes indicated in the specification 900 are in bits, but in some embodiments of the specification 900, each element of a key may be larger or smaller than those contained in the exemplary specification 900 shown in FIG. 9A.

Each file in the file system is referred to by a unique file number. The parent file number 902 refers to a folder that holds the current file. The CRC value 904 is a hash value generated from the name of the file. The duplicate count 906 can be any number used to disambiguate two or more file names in the system that generate identical hash values for the CRC value 904. In one embodiment, if there are no previously stored values identical to a newly created CRC value 904, the duplicate count 906 for the newly created file can be set to zero. If a newly created CRC value 904 matches an already stored value (or values), the duplicate count 906 for the newly created file can be set to any other number that would not match the already stored duplicate count 906 values for that CRC value 904. In one example, each newly added duplicate count 906 can be one greater than the previous highest duplicate count 906 for all files having a matching CRC value 904. The sequence number 908 is incremented for entries in which the value field of the key-value pair is too small to hold the entire file name. Together, the parent file number 902, CRC value 904, and duplicate count 906 combine to form a key that uniquely identifies each file in the system, and allows the tree manager 116 to look up each file in the directory tree. The sequence number 908 is appended to this key to allow long file names to be split across multiple entries.

FIG. 9B illustrates an example of a key-value pair 910 of the directory tree according to the exemplary specification 900. The parent file number 902a indicates that the directory having a file number of "5" is the parent directory of this file. The CRC value 904a is "27 AC," which is an example value generated from the file name using a hash function. The duplicate count 906a is "0," which can indicate that this file is the only one with a CRC value 904 of "27 AC" in the directory tree. In other embodiments, the duplicate count 906a of "0" can simply indicate that no other file has both a CRC value 904 of "27 AC" and a duplicate count 906a of "0." The sequence number 908a of "1" indicates that this is the first key-value pair in the sequence representing this file.

The file name 912a and file number 914a are stored in the value portion of the key-value pair 910. In the first entry in a sequence, the first sixteen bytes of the value store the first sixteen bytes of the file name, and the last four bytes of the value store a unique file number associated with the file. In one exemplary embodiment, although there are four bytes available to store the unique file number, the file number is limited to thirty bits in length. In the example key-value pair 910, the file name 912a is shown with the value "FOO.TXT," and the file number 914a is shown with the value "7."

FIG. 9C illustrates an example of multiple key-value pairs 916, 918, 920 associated with a single file from the directory tree. The use of multiple key-value pairs is necessary when the entire file name fails to fit within the sixteen bytes of the value allotted to store the file name in the first entry in the sequence. The file of FIG. 9C is shown with a parent directory 902b of "5," a CRC value 904b of "3A41," and a duplicate count 906b of "0." Since the file name is split across three entries, the sequence number 908b is incremented for each entry. The value of the first entry 916 is split between the first portion of the file name 912b, storing the value "THIS IS," and the unique file number 914b, storing the value "8." The value 922 of the second entry 918 is not split, but instead contains the next portion of the file name, "A VERY LONG." The value 923 of the third entry 920 is also not split, and contains the remainder of the file name, "FILE NAME."

Allocation Tree Contents and File Metadata

FIG. 10A illustrates an exemplary specification 1000 of a key in the allocation tree. The allocation tree stores two types of data: metadata that describes attributes of each file, and extents that point to the storage locations that contain the file data. Each key in the allocation tree includes a file number 1002, a primary/secondary flag 1004, a stream type flag 1006, and an offset value 1008. As above, while the size in the exemplary specification 1000 is denoted in bits, this should be taken as exemplary and not as limiting. Other embodiments may use different sizes for each field.

The file number 1002 matches the file number 914 from the directory tree. This allows the file system to find the file number for a file in the directory tree using the parent directory and the hash of the file name, and then to use that file number to build a key to access the various types of information available in the allocation tree.

The primary/secondary flag 1004 denotes whether a given key denotes information from the primary pool (transacted data) or the secondary pool (working data). The stream type flag 1006 denotes whether a given key stores data for an extent (that is, the value points to a storage location containing file data) or for an attribute (that is, the value contains file metadata such as a creation date/time, file permissions, or the like). The offset value 1008 is interpreted based on the value of the stream type flag 1006.

In the case when the stream type flag 1006 is "0" to indicate, in this example, that the key-value pair stores data for an extent, the offset value 1008 contains an encoded file position, in blocks. The file position for a given key-value pair is encoded as the start location plus the extent length minus one. This allows a binary search for the entry to return the correct entry. The first four bytes of the value of the key-value pair indicate a starting block of the extent, and the last four bytes of the data value indicate the number of blocks in the extent.

FIG. 10B illustrates an example of a key-value pair 1010 representing an extent associated with the file of FIG. 9B. The file number 1002a of "7" matches the file number 914 from the directory tree. The primary/secondary flag 1004a is "0," indicating that this data is in the primary pool. The stream type flag 1006a is "0," indicating that the key-value pair 1010 refers to extent data. The offset value 1008a is "4," indicating that the key-value pair represents the file start position, because the start offset of zero plus the extent length of five minus one is four. The first half of the value of the key-value pair, which represents the start block 1012, is "3A32CF28," and the second half of the value of the key-value pair, which represents the length of the extent 1014, is "5."

In the case when the stream type flag 1006 is "1" to indicate, in this example, that the key-value pair stores attribute data, the offset value 1008 indicates the type of information stored in the value of the key-value pair. FIG. 11A illustrates a chart 1100 with an example of one embodiment of the values encodeable in the offset value 1008. An offset value 1008 of "0" indicates that the value represents Unix-like file ownership information such as a Group ID and User ID 1102. An offset value 1008 of "1" indicates that the value represents a link count and permission flags 1104. An offset value 1008 of "2" indicates that the value represents standard file attributes 1106, such as archive, hidden, system, and the like. An offset value 1008 of "3," "4," or "5" indicates that the value represents the last accessed date/time 1108, last modified date/time 1110, or creation date/time 1112, respectively. In some embodiments, values higher than "5" are reserved for later use 1114, or for OEM attributes 1116 which are determined by a third party user of the file system.

FIG. 11B illustrates an example of a key-value pair 1118 representing attribute data for the file of FIG. 9B. As above, the file number 1002b of "7" matches the file number 914 from the directory tree, and the primary/secondary flag 1004b is "0," indicating that this data is in the primary pool. The stream type flag 1006b is "1," indicating that the key-value pair 1118 refers to attribute data. The offset value 1008b is "5," indicating that the value 1108a of the key-value pair represents the file creation date/time 1112. These values can be combined to form a key of "7015." Though this description has and will continue to refer to keys as four-digit numbers wherein the first digit represents the file number 914, the second digit represents the primary/secondary flag 1004, the third digit represents the stream type flag 1006, and the fourth digit represents the offset value 1008, this is for ease of discussion only. Those of ordinary skill in the art would understand that this is a simplification of the key, and in some embodiments the key is a much larger value, such as the 64-bit combination of the four values described in FIG. 10A.

Metadata Shortcuts

One additional feature of certain embodiments of the fault-tolerant tree 300 described above relates to the retrieval of an adjacent key-value pair instead of a requested key/value pair. For example, in the tree 300 illustrated in FIG. 3A, a request for the key/value pair associated with the key "D" would return the value associated with key 322 in leaf node 320, because the key is present in the tree 300. If the key "E" was requested, the tree manager 116 may respond in several ways. In a traditional tree, the tree manager 116 would simply return an error, stating that key "E" could not be found. However, in certain embodiments of the fault-tolerant tree 300, the tree manager 116 returns the value associated with the next highest key in the case where a requested key could not be found. So, if key "E" was requested, the tree manager 116 would return a code indicating that the next highest key was found, and return the value associated with key 324 in leaf node 320, key "F." If no higher key is found (for example, if the key "Y" was requested), the tree manager 116 may still return a key not found error, but for other cases, the tree manager 116 will return the next highest key-value pair.

Figure 12A:
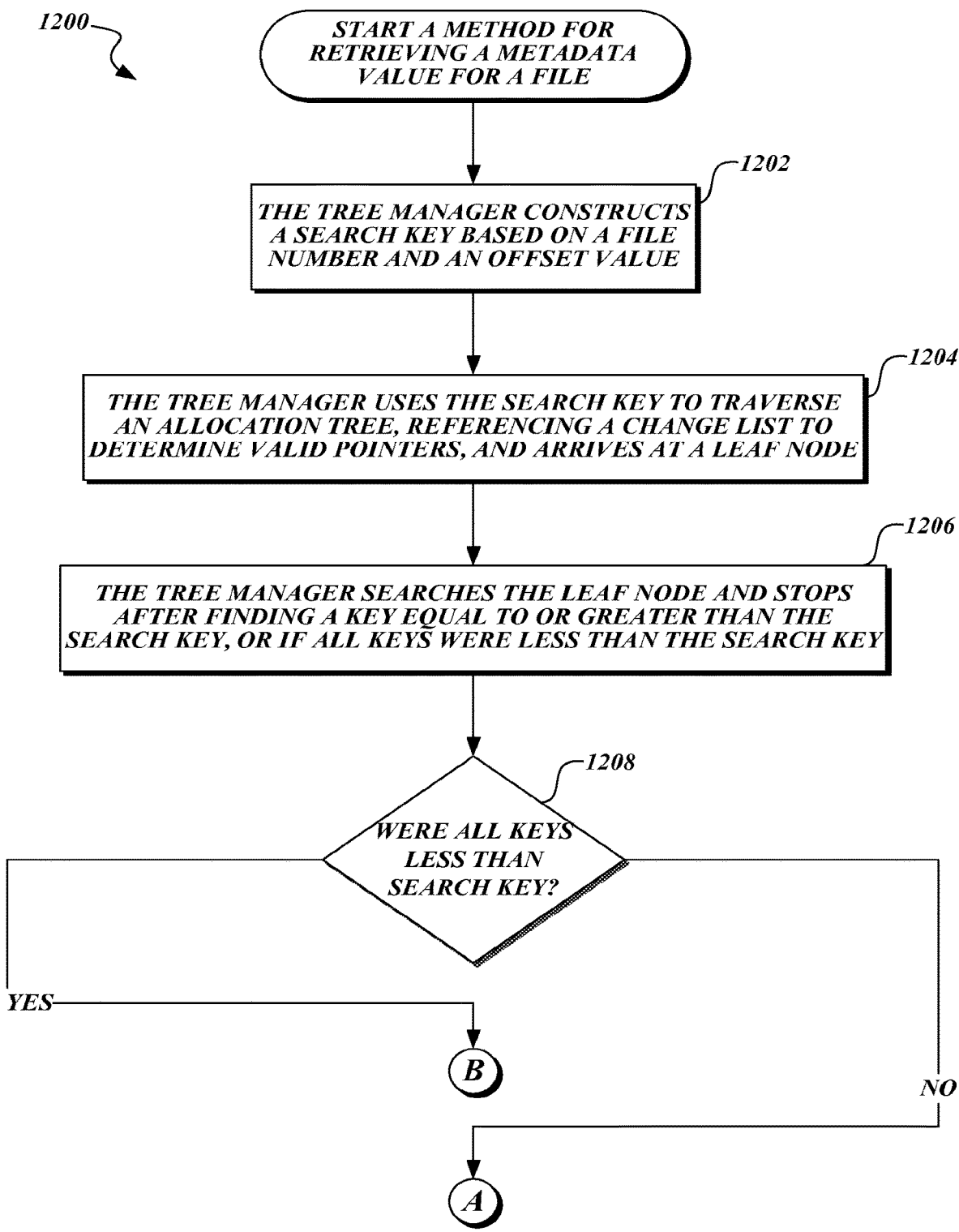
FIGS. 12A-12C illustrate a method for retrieving a metadata value for a file according to various embodiments of the present disclosure.
Figure 12B:
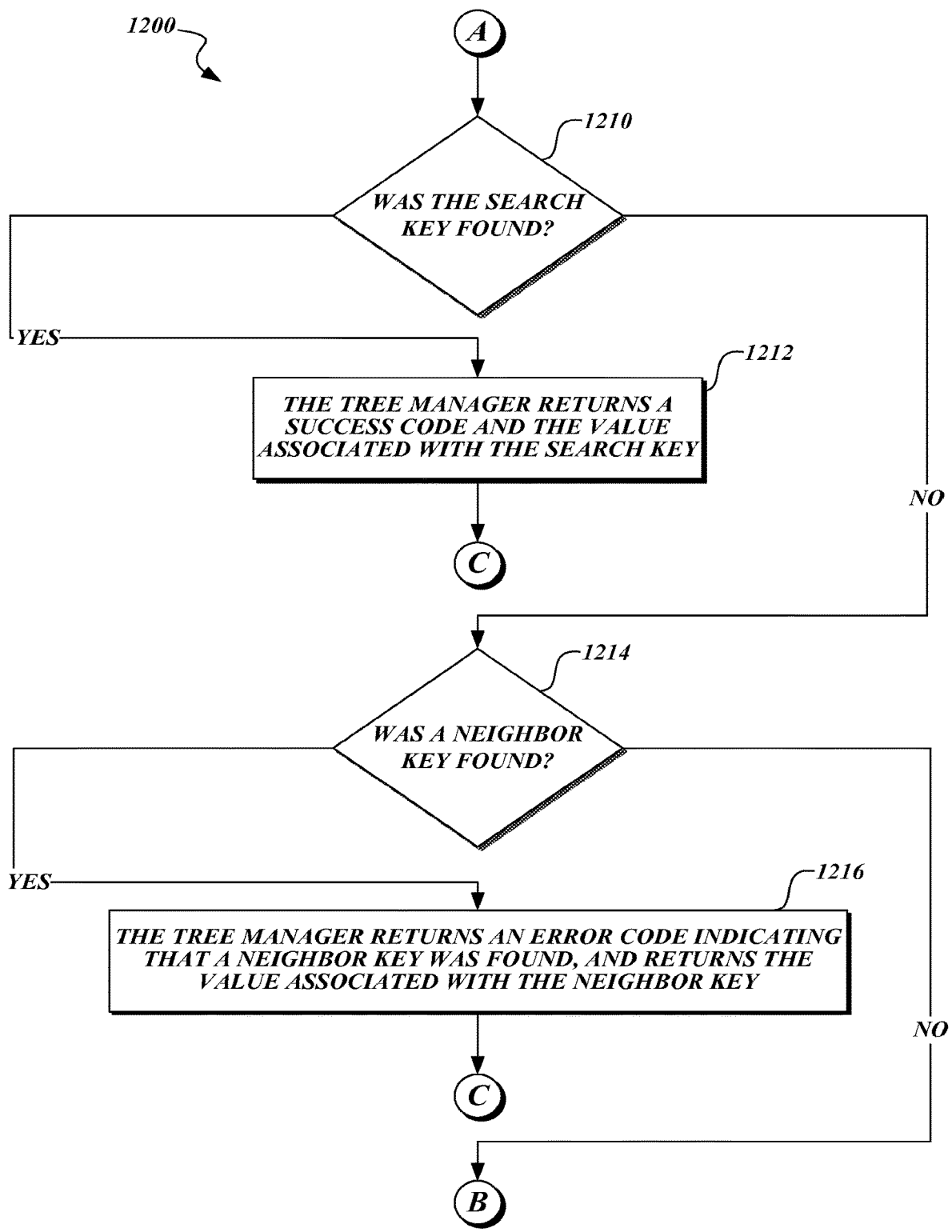
Figure 12C:
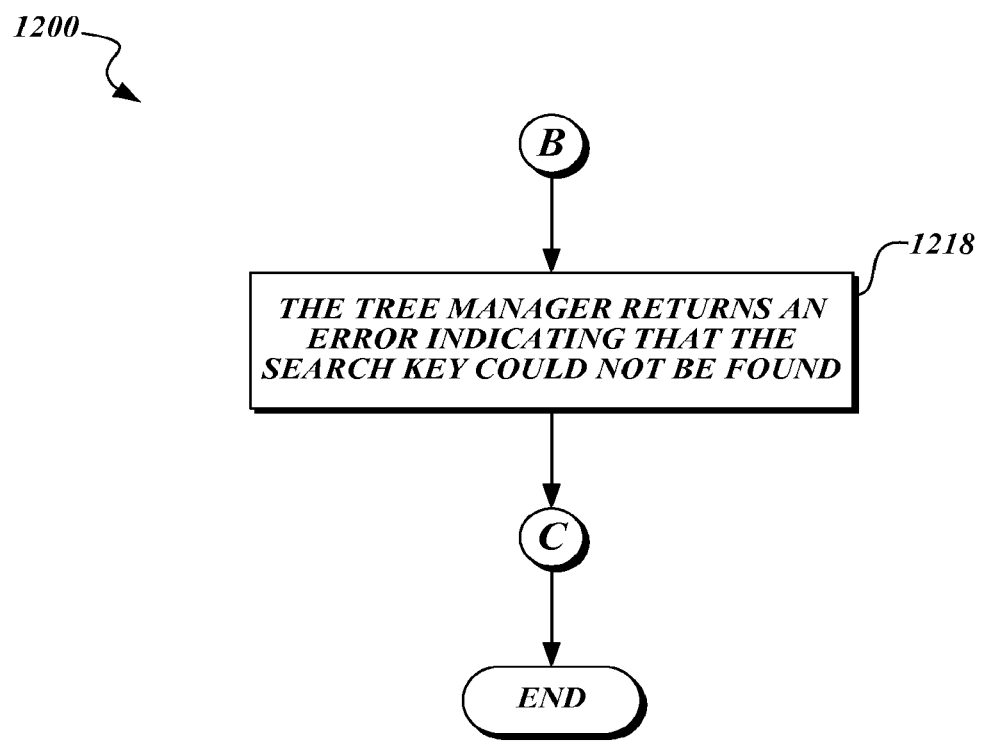

FIGS. 12A-12C illustrate a method 1200 for retrieving a metadata value for a file from an allocation tree according to various embodiments of the present disclosure. From a start block, the method 1200 proceeds to block 1202, where the tree manager 116 constructs a search key based on a file number and an offset value. Next, at block 1204, the tree manager 116 uses the search key to traverse an allocation tree, referencing a change list 402 to determine valid pointers, and arrives at a leaf node. The method 1200 then proceeds to block 1206, where the tree manager 116 searches the leaf node and stops after finding a key equal to or greater than the search key, or after finding that all keys in the leaf node were less than the search key. Next, at decision block 1208, a test is performed to determine whether all keys were less than the search key. If the answer to the test at decision block 1208 is YES, the method 1200 proceeds to a continuation terminal ("terminal B"). Otherwise, if the answer to the test at decision block 1208 is NO, the method 1200 proceeds to a continuation terminal ("terminal A").

From terminal A (FIG. 12B), the method 1200 proceeds to a decision block 1210. At this point, the method 1200 has found either the search key or a key larger than the search key. At decision block 1210, a test is performed to determine if the search key was found. If the answer to the test at decision block 1210 is YES, the method 1200 proceeds to block 1212, where the tree manager 116 returns the value associated with the search key, and then to a continuation terminal ("terminal C").

Otherwise, if the answer to the test at decision block 1210 is NO, the method 1200 proceeds to another decision block 1214, where a test is performed to determine whether a neighbor key was found. At this point, the tree manager 116 has found some key larger than the search key. The test for a neighbor key determines whether the larger key is relevant to the original query. In a first embodiment, the test for a neighbor key will succeed no matter what the larger key is. In a second embodiment, the test for a neighbor key will only succeed if the found key is the next expected key in order. In a third embodiment, the test for a neighbor key will only succeed if the found key has at least a portion of the key in common with the search key. The first, second, and third embodiments of the test for a neighbor key are exemplary only, and other tests are possible.

As examples of the above embodiments, a search key such as "7013" can be formed by combining the file number 1002, primary/secondary flag 1004, and stream type flag 1006 of the key in FIG. 11B with an offset of "3." This would create a search key to find the last accessed date/time for file number "7." In the first embodiment, the test for a neighbor key would succeed when the larger key is any key greater than "7013." In the second embodiment, the test for a neighbor key would succeed if the larger key was "7014," but not if it was any larger. In one example of the third embodiment, the portion of the larger key that corresponds to the file number is compared to the corresponding portion of the search key. So, if the larger key started with a "7," indicating that the larger key was related to the same file number, the test for a neighbor key would succeed.

If the answer to the test at decision block 1214 is YES, the method 1200 proceeds to block 1216, where the tree manager 116 returns an error code indicating that a neighbor key was found, and returns the value associated with the neighbor key. The calling program can use the error code to determine that the search key was not found, and decide whether the neighboring key is adequate for the calling program's purposes. The method 1200 then proceeds to a continuation terminal ("terminal C"). Otherwise, if the answer to the test at decision block 1214 is NO, the method 1200 proceeds to a continuation terminal ("terminal B").

From terminal B (FIG. 12C), the method 1200 proceeds to block 1218. At this point, the method 1218 has determined that neither the search key nor an appropriate neighboring block could be found. At block 1218, the tree manager 116 returns an error indicating that the search key could not be found. Next, the method 1200 proceeds to a continuation terminal ("terminal C"), then to an end block, and terminates.

In embodiments using a method such as method 1200 to return neighboring values from the allocation tree, the organization of the offset values 1100 can allow the file system to assume values for missing keys. This is advantageous at least because space can be saved in the storage medium by eliminating the need to store redundant or otherwise useless information, and because such assumptions can be made after merely one query or traversal of the tree.

One particularly useful application of this technique is in storing file metadata in the allocation tree, since file metadata can often be redundant. For example, though every file is associated with a creation date/time, many files will not be modified or accessed after being created. One example of this is storage on a digital camera, where once a picture is taken, it is not likely to be modified or accessed until transferred to another device. In this case, the last accessed date/time and last modified date/time would be the same as the creation date/time for most of the files. Similarly, if a file has been modified but not accessed since modification, the last accessed date/time would be the same as the last modified date/time (though different form the creation date/time). Also, if a file has been accessed since creation but not modified, the last accessed date/time would be different, but the last modified date/time and the creation date/time would be the same. In each of these cases in a conventional file system, the duplicated data is redundant but is stored anyway, wasting space on the storage medium.

In embodiments of the fault-tolerant file system, metadata entries are stored as key-value pairs in the allocation tree. For certain types of redundant data, the redundant entries are deleted (or not stored in the first place), thereby saving space on the storage medium and reducing the size of the allocation tree. The fault-tolerant file system then assumes the values of these missing metadata entries based on the existing values.

In one embodiment, each file has a metadata value stored in the allocation tree for the creation date/time 1112 (FIG. 11A). If the last modified date/time 1110 for a file is requested but there is no value stored in the allocation tree for the last modified date/time 1110, then the value stored for the creation date/time 1112 is returned instead. If the last accessed date/time 1108 for a file is requested but there is no value stored in the allocation tree for the last accessed date/time 1108, then the value stored for the last modified date/time 1110 is returned instead (or the value for the creation date/time 1112, if the last modified date/time 1110 is missing as well). These properties can also be used when updating metadata values in the tree. For example, if a file is modified, it is also accessed, which would lead to both values being updated to the same value. So, when a file is modified, the last modified date/time 1110 value in the allocation tree is updated, and the last accessed date/time 1108 value, if present, is deleted. In these ways, although a value for creation date/time 1112 will always be stored, values for last modified date/time 1110 and last accessed date/time 1108 will only be stored if the information would be useful.

Similar logic can be applied to the remaining metadata values, as well. For example, in one embodiment, a file is considered to have a default set of file attributes 1106 upon creation. Unless the file attributes 1106 are changed, no value for the file attributes 1106 is stored in the allocation tree, and when no value for the file attributes 1106 is found for the given file, it is assumed to be the default set of attributes. Likewise, the link count is assumed to be one (a link from the parent folder) and the permissions are assumed to be an appropriate value, and no value is stored in the allocation tree for the link count/permissions 1104 unless changed from these defaults. Also, the group ID and user ID values are assumed to be an appropriate value such as the group ID and user ID associated with the user creating the file, and no value is stored in the allocation tree for the group ID/user ID 1102 unless changed from these defaults.

The system can use the logic described in a method such as method 1200 to determine the value of missing keys, and to distinguish cases when a key has been removed for efficiency from cases when a requested file does not exist. One embodiment uses a method such as method 1200, wherein the neighbor test succeeds no matter how much larger the larger key is. Using the example of FIG. 11A, and assuming that entries with keys having reserved 1114 or OEM attribute 1116 values are ignored or otherwise filtered out, one can see that the highest offset value for a given file will always be for the creation date/time 1112. Since the offset value 1008 is the last portion of the key used to search the allocation tree, the creation date/time 1112 will be the highest-valued metadata attribute present in the allocation tree for a given file.

To illustrate this embodiment with a further example, consider the file represented by the key-value pair 1118 of FIG. 11B. A key constructed to search for the file attributes 1106 of this file would be "7012", with "7" for the file number 1002, "0" for the primary/secondary flag 1004, "1" for the stream type flag 1006, and "2" for the offset 1008. If an entry is present in the metadata tree for the file attributes 1106, then the tree manager 116 will return a success code and a value associated with the file attributes 1106 key. If an entry is not present in the metadata tree for the file attributes 1106, the tree manager 116 will return an error code and a neighboring entry, if one exists. One such entry might be associated with the key "7015", such as depicted in FIG. 11B. The file system can recognize that this key is the creation date/time 1112 offset for file number "7," and can therefore infer that file "7" exists and the file attributes 1106 have not been changed from the default value. If the tree manager 116 returns an error code and a neighboring entry such as, for example, "8010," the file system can recognize that this key is the group ID/user ID 1102 offset for file number "8," and can therefore infer that file "7" does not exist (because if it did, a value for the creation date/time 1112 offset for file number "7" would have been returned).

Avoiding Add-Remove Cycles in an Allocation Tree

In another exemplary embodiment of a fault-tolerant file system, the allocation tree not only contains entries for blocks that are assigned to files, but also contains entries for a file that tracks unused blocks. In this case, tree management techniques intended to keep the allocation tree efficiently structured can lead to cycles between adding previously used blocks to the tree because they have recently been freed, and removing previously unused blocks from the tree to allocate additional tree space to accommodate the previously used blocks.

Two such tree management techniques are a node split and a level increase. A node split takes place when an attempt is made to add a key-value pair to a node that doesn't have space to hold it. As an example, say each node has space for fourteen key-value pairs, and initially, the only node in the tree is a single leaf node. If the leaf node already contains fourteen key-value pairs and another key-value pair needs to be added, the leaf node is split. A new leaf node is allocated, half of the key-value pairs are moved to the new node, and the new key-value pair is added to the appropriate leaf node. In addition, a new intermediate node is created that points to the two leaf nodes. As there was no previous intermediate node pointing to the leaf node, this node split results in a level increase in the tree. Once more than one leaf node is present, values may also be moved between leaf nodes if a key-value pair is to be added to a given leaf node which is full, but neighboring leaf nodes have empty space.

As key-value pairs continue to be added to the tree, the leaf nodes continue to split, key-value pairs continue to be moved between the leaf nodes, and new key-value pairs continue to be added to the intermediate node to track the new nodes, as described above. When the intermediate node becomes full, the intermediate node is split, which may lead to another level increase. One slight difference between splitting an intermediate node and a leaf node is that, while key-value pairs are moved among intermediate nodes after a split, key-value pairs will not be moved among intermediate nodes to prevent a split.

Another tree management technique that may cause the problems mentioned above is a node merge. Merges occur when key-value pairs are removed from the tree. After removing a key-value pair from a first node, if it is determined that a second, neighboring node contains a number of key-value pairs that will fit alongside the remaining key-value pairs of the first node in a single node, all the keys will be moved into one of the nodes, and the empty node will be freed. The removal of a leaf node leads to the removal of the associated key-value pair from the intermediate node above it, which may then also merge, all the way up to the root node. If the root node contains only a single pointer, the root node is no longer necessary and can also be removed, resulting in a level decrease.

Figure 13A:
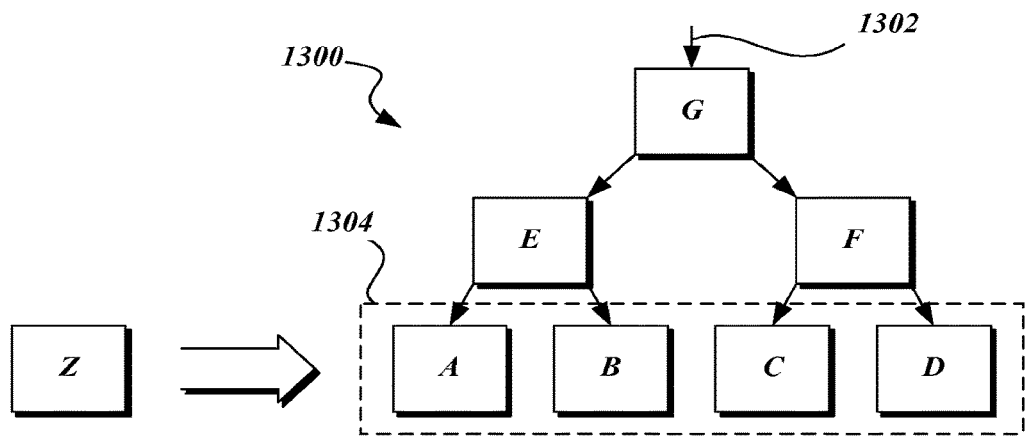
FIGS. 13A-13C illustrate a way in which an add-remove cycle may be created in a tree structure that tracks unallocated blocks of storage space.
Figure 13B:
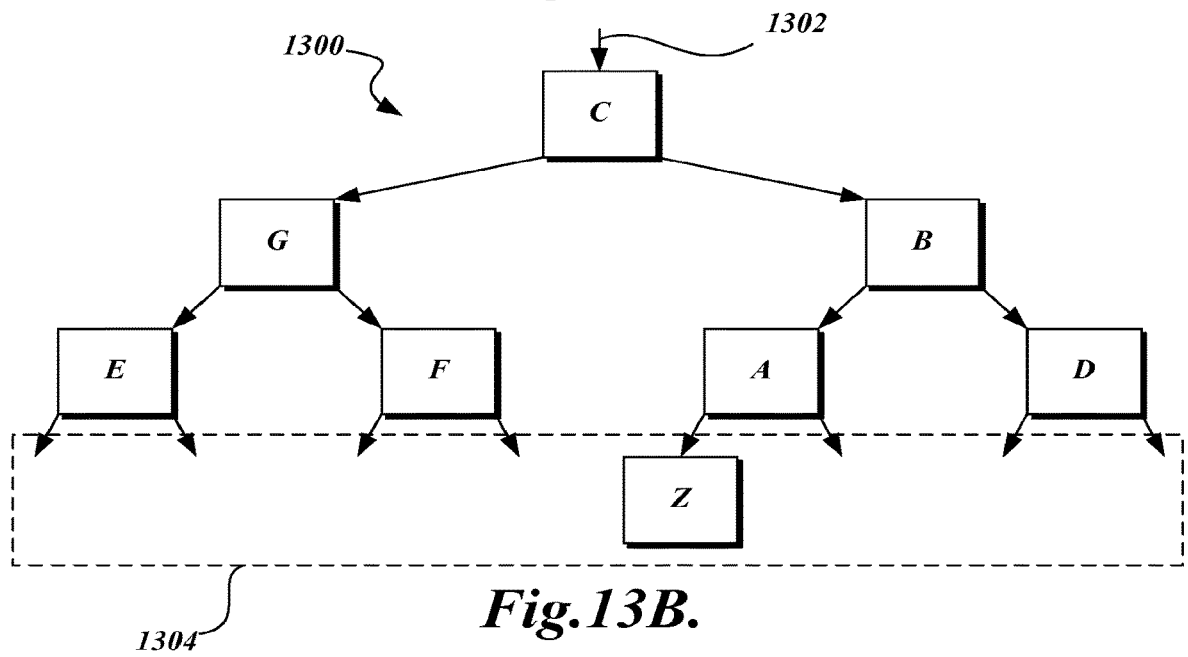
Figure 13C:
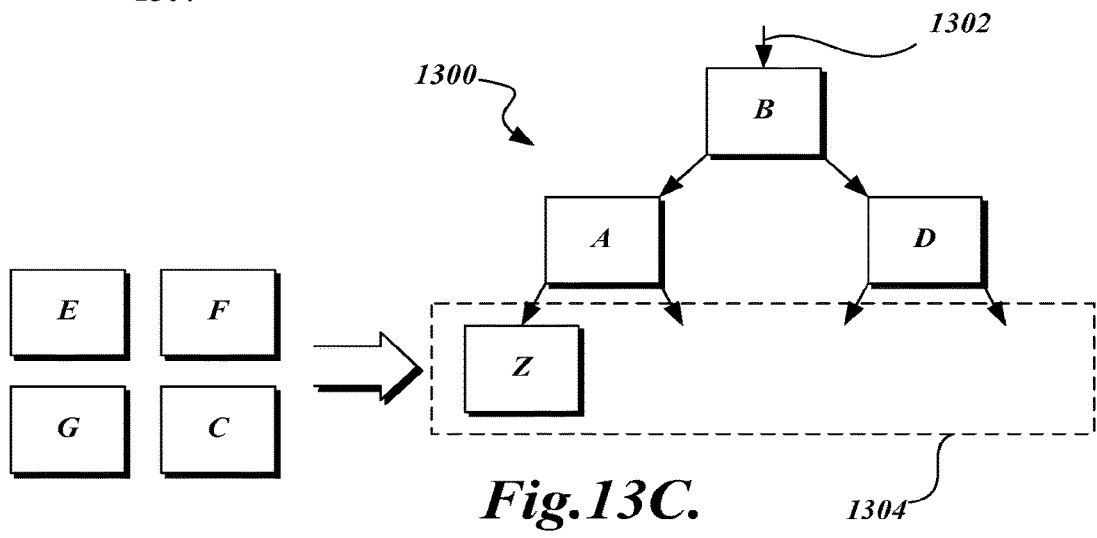

FIGS. 13A-13C illustrate a simplified example of a problem that can occur when techniques like these are used in a tree 1300 which tracks free blocks. In these figures, the letters appearing in each block are labels used to refer to each block, and the arrows indicate pointers from intermediate nodes (such as Blocks E, F, and G) to other intermediate nodes or leaf nodes (such as Blocks A, B, C, and D). The root pointer 1302 indicates the root node of the tree. A pointer in FIGS. 13A-13C is similar to the key-value pairs stored in the intermediate nodes as described above, although, for ease of discussion, each intermediate node of FIGS. 13A-13C only contains two pointers to other nodes. The leaf nodes represent free blocks 1304. In order to increase the size of the tree 1300 by adding nodes to the tree 1300, blocks must be allocated from the free blocks 1304. To further simplify the discussion, instead of merging and splitting nodes in the tree 1300, the illustrated embodiment removes intermediate nodes that have no children, and removes the root node if it has only one child. Further, the illustrated embodiment only adds nodes in a balanced manner, so if an intermediate node is created, two child nodes of the intermediate node are also created.

FIG. 13A illustrates a situation before adding Block Z to the tree 1300. The root pointer 1302 points to Block G, which has two children, Blocks E and F. Block E has two children, Blocks A and B, and Block F has two children, Blocks C and D. Blocks A, B, C, and D are free blocks 1304. Block Z is to be added to the tree 1300. However, Block E and Block F are both full, so at least one new intermediate node must be created.

FIG. 13B illustrates the situation after enough blocks from the free blocks 1304 have been allocated, and Block Z is added to the tree 1300. As the tree was completely full, a level increase was required. Block C was removed from the free blocks 1304 to become the new root node, and the root pointer 1302 was changed to point to Block C. Block B was removed from the free blocks 1304 to act as a new intermediate node, and Blocks A and D were removed from the free blocks 1304 to act as new intermediate nodes below Block B. After this new space was allocated, there was room to add Block Z to the tree 1300, which was added to the free space 1304 as a leaf node under Block A.

FIG. 13C illustrates the situation after the tree 1300 is cleaned up after the addition of Block Z. Blocks E and F are removed from the tree 1300 because they no longer have any children. Likewise, after Blocks E and F are removed from the tree 1300, Block G also has no children, and is also removed from the tree 1300. Finally, since Block C is the root node and has only one child, it is also removed from the tree 1300 and the root pointer 1302 is reassigned to Block B. Now, Blocks E, F, G, and C are illustrated as waiting to be added to the free space 1304. However, as one can plainly see, there are only three remaining spaces for leaf nodes in the free space 1304, and after adding three of the four blocks, the situation of FIG. 13A will recur.

When tree transactions begin to deal with increasing numbers of nodes at once, the problems described above may occur with greater frequency. As described above, nodes are allocated in the allocation tree in pairs: a transacted state block and a working state/unused block. When a new block is allocated, two blocks must be removed from the tree 1300 that tracks the free blocks. When a previously used logical block is freed, two blocks must be added to the tree 1300 that tracks the free blocks. Since none of these blocks are guaranteed to be contiguous or otherwise next to each other in an extent or a leaf node, the addition of the multiple blocks to the tree 1300 or removal of the multiple blocks from the tree 1300 can quickly lead to the above-described issues arising.

Figure 14A:
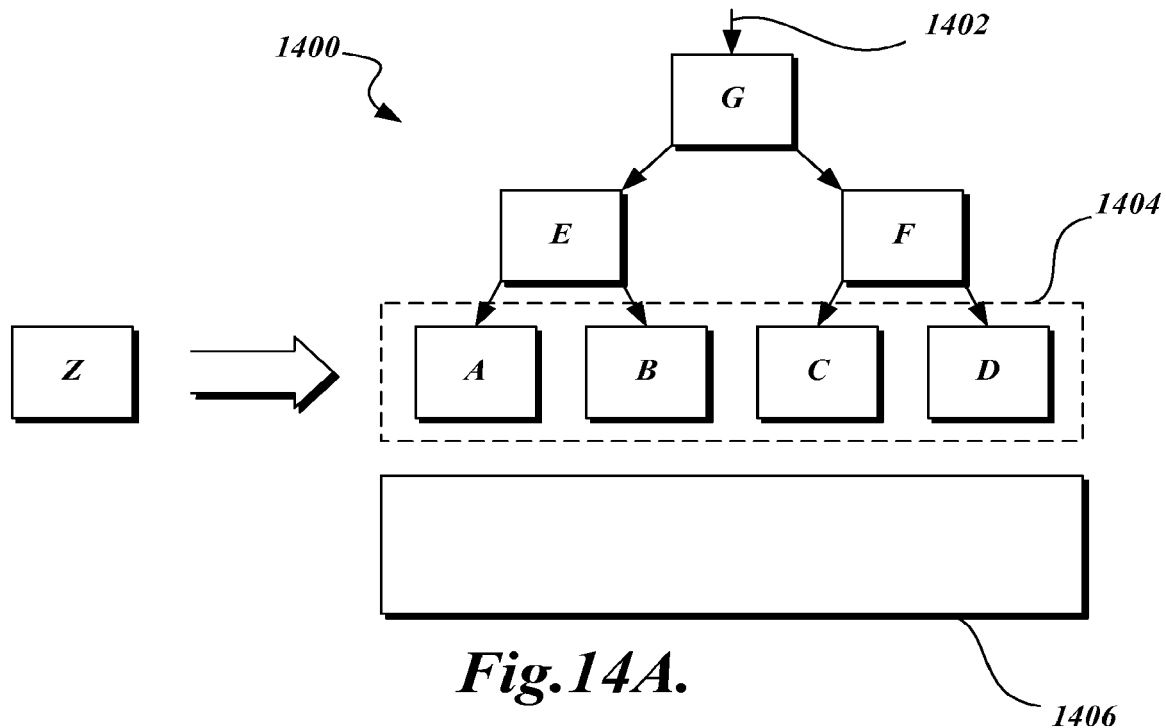
FIGS. 14A-14D illustrate use of a cycle remover to prevent add-remove cycles in a tree structure that tracks unallocated blocks of storage space according to various embodiments of the present disclosure.

FIGS. 14A-14D illustrate one exemplary way of managing metadata blocks within a tree structure that itself manages free blocks while addressing problems such as those described above. FIG. 14A shows a tree 1400 similar to tree 1300, having a root pointer 1402 and a number of leaf nodes that comprise free blocks 1404. A Q-Block 1406 has been added to the system to help avoid problems with cycles. The Q-Block 1406 functions as an intermediate point for adding free blocks to and removing free blocks from the free block tracking tree 1400. In other words, when free blocks are allocated and removed from the tree 1400, they are first added to the Q-Block 1406. Also, when blocks are freed, they are first added to the Q-Block 1406. The tree 1400 is then added to by removing blocks from the Q-Block 1406 instead of directly from the tree 1400.

Figure 14B:
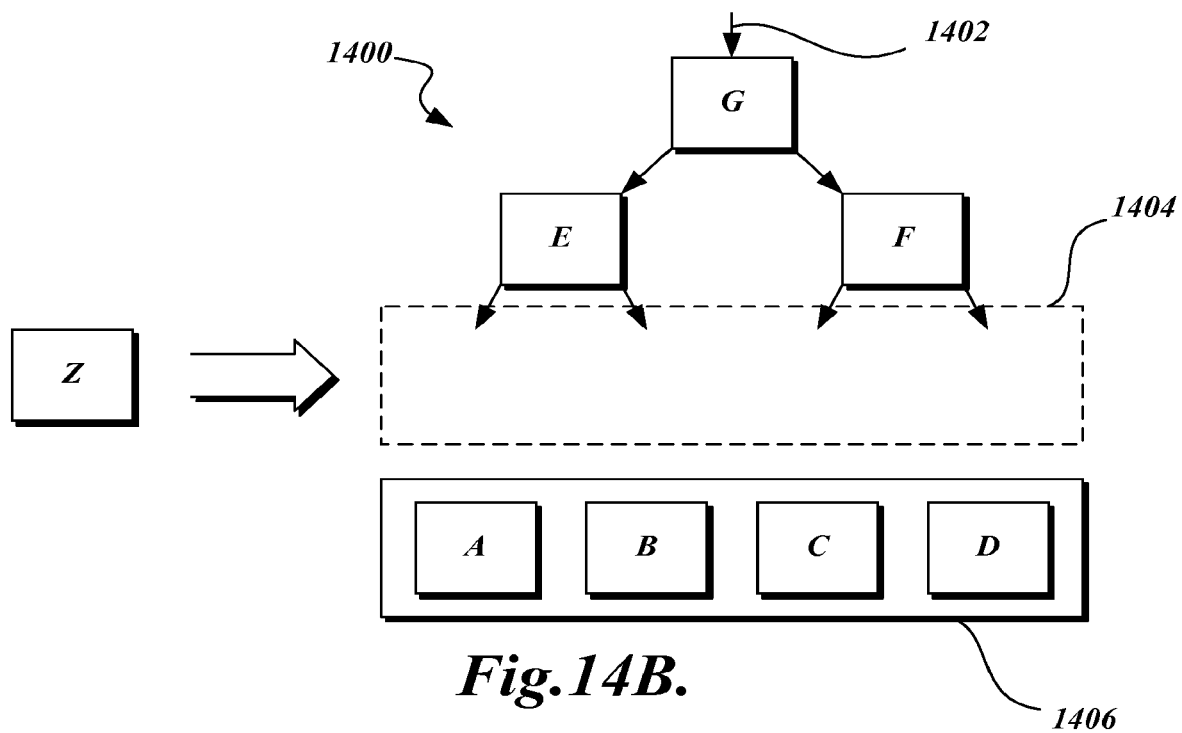

In the FIGS. 14A-14D example, Blocks A, B, C, and D are again free blocks, and Block Z is newly freed and is to be added to the tree 1400. FIG. 14B shows that, in order to add Block Z to the tree 1400, four blocks will have to be allocated. This is similar to what was illustrated in FIG. 13B and described above. However, in FIG. 14B, the four blocks to be allocated are removed from the tree 1400 and, instead of being added directly as intermediate nodes of the tree 1400 (as in FIG. 13B), the four blocks are added to the Q-Block 1406.

Figure 14C:
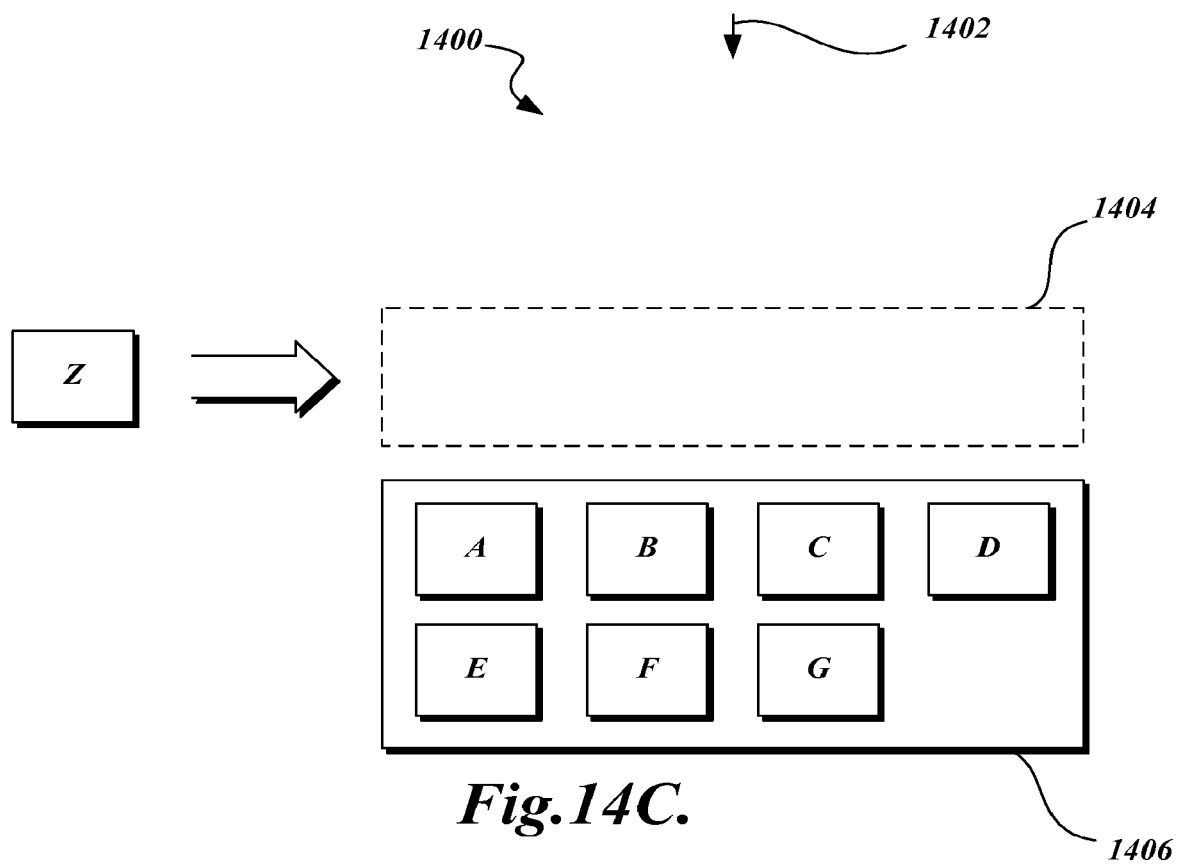

Moving to FIG. 14C, the tree cleanup/balancing procedure described above takes place. Since neither Block E nor Block F has any children, Blocks E and F are freed, and are added to the Q-Block 1406. Subsequently, since Block G also has no children, it is also freed and added to the Q-Block 1406. At this point, Blocks A, B, C, D, E, F, and G have all been freed, and are all residing in the Q-Block 1406. Thus, at this point, the tree 1406 is empty, and root pointer 1402 is not pointing to anything.

Figure 14D:
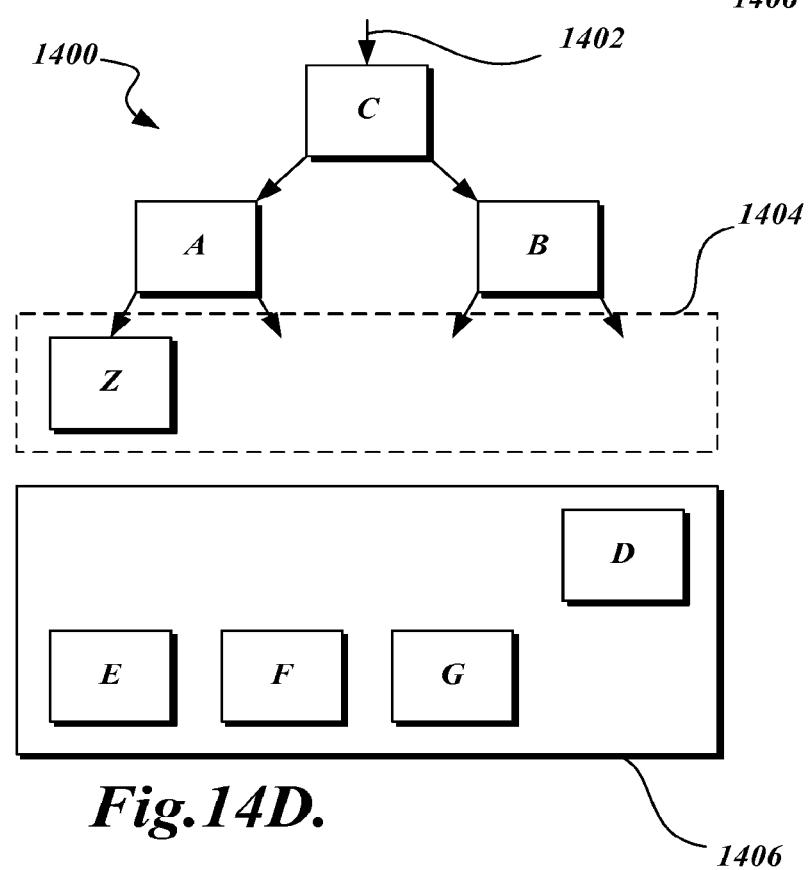

Finally, as shown in FIG. 14D, the system fulfills the original request to add Block Z to the tree 1400. To fulfill the request, a minimally sized tree is created by taking Block C from the Q-Block 1406 and using it as the root node, by taking Blocks A and B from the Q-Block 1406 and using them as the intermediate nodes, and adding Block Z to the reconstructed tree 1400 as the sole free node 1404. In other embodiments, because the tree 1400 was empty in FIG. 14C, a tree of less than three levels is created. For example, a tree consisting of one leaf node, to which the root pointer 1402 points, may be created. As another example, a tree having one intermediate node as the root node and one leaf node may be created.

As shown in FIG. 2, the master block 202 contains a pointer to a Q-Block 212. The pointer in the master block 202 can contain a null value in cases where a Q-Block 212 does not exist. In that case, the first time a free block is removed from the tree 1400, it is converted into a Q-Block 1406, and the pointer in the master block 202 is updated to point to the new Q-Block 1406. Each Q-Block has a limited amount of storage to keep track of blocks, and a pointer to another Q-Block. The pointer to another Q-Block for the first Q-Block in the system contains a null value. Once the Q-Block storage has reached capacity, the next block to be added to the Q-Block will instead be converted into another Q-Block. The pointer in the new Q-Block will be updated to point to the old Q-Block, and the pointer in the master block 202 will be updated to point to the new Q-Block. FIG. 2 depicts this scenario, as Q-Block 212 points to Q-Block 214. This process works in reverse, as well. When blocks are needed by the system, they are removed from the Q-Block 212 pointed to by the master block 202. When the Q-Block 212 is empty, the next request for a block causes the Q-Block 212 to be reallocated as a normal block, and the pointer in the master block 202 is set to the value of the pointer in the Q-Block 212. As illustrated in FIG. 2, the pointer in the Q-Block 212 would point to the Q-Block 214. As those of ordinary skill in the art would recognize, if there is only one Q-Block in the chain, the pointer in the Q-Block pointed to by the master block 202 would be a null value, and reallocating this Q-Block would cause the pointer in the master block 202 to be set to the null value.

Figure 15A:
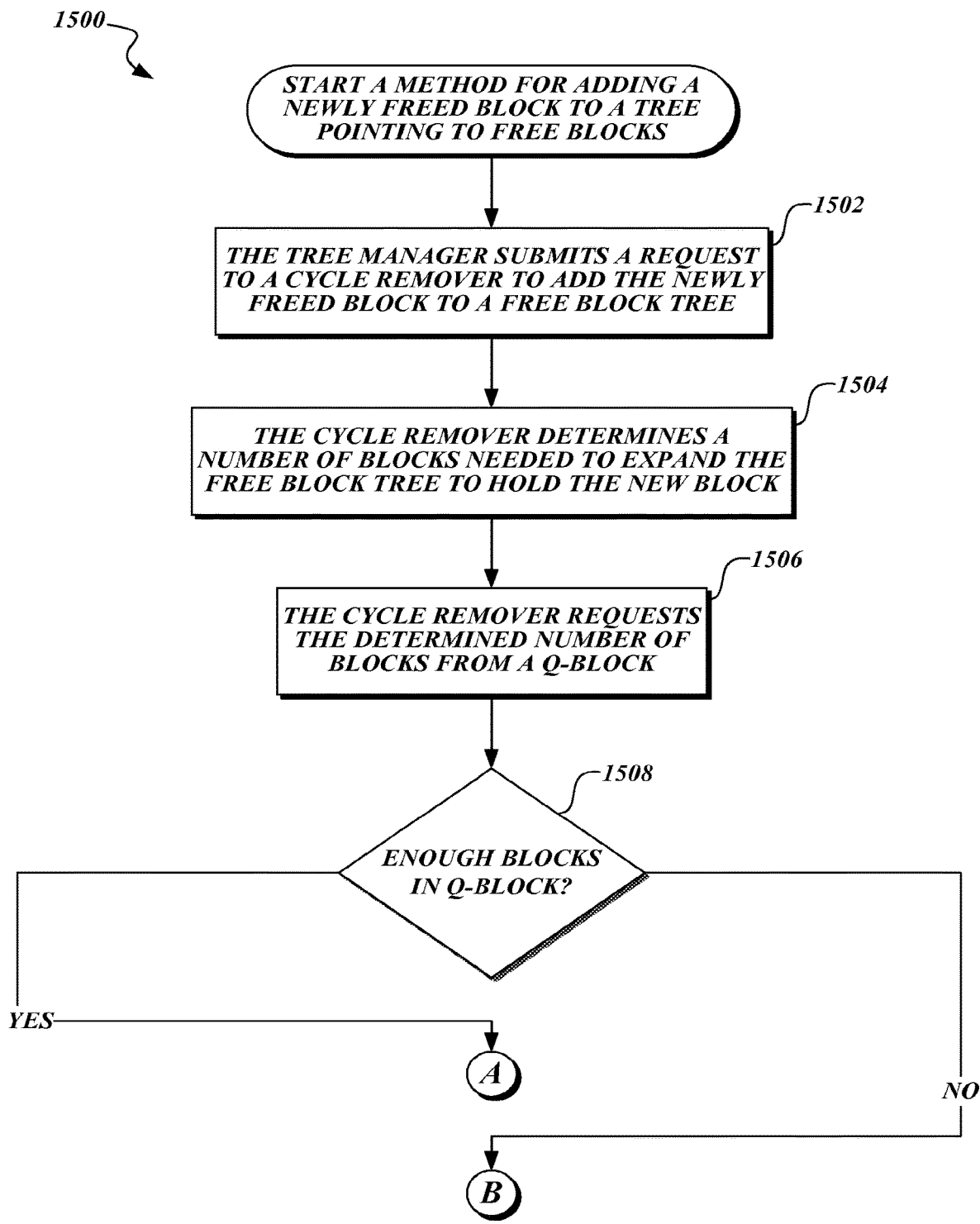
FIGS. 15A-15B illustrate a method for adding a newly freed block to a tree tracking unallocated blocks according to various embodiments of the present disclosure.
Figure 15B:
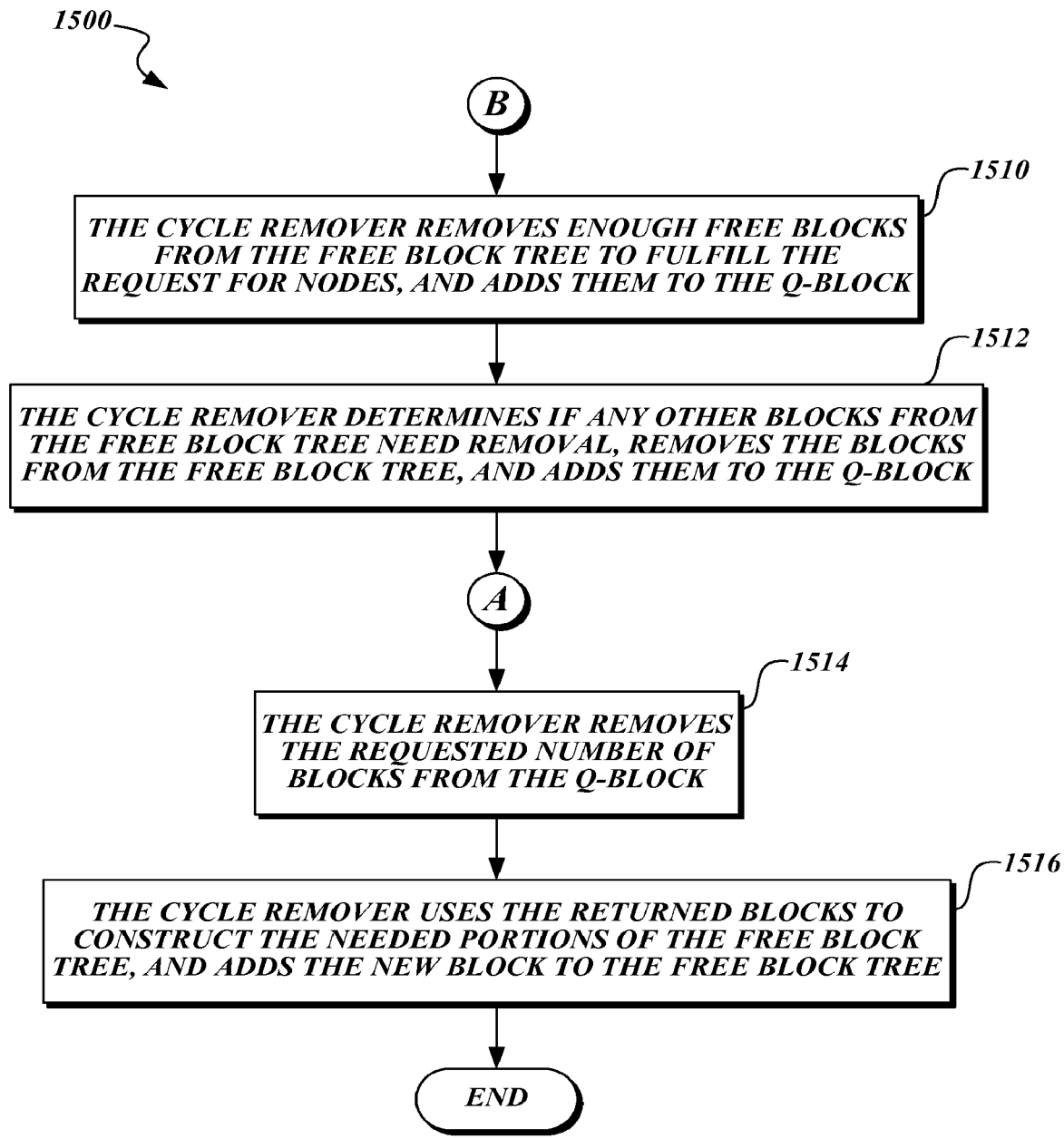

FIGS. 15A and 15B illustrate an exemplary embodiment of a method 1500 for adding a newly freed block to a tree pointing to free blocks. From a start block, the method 1500 proceeds to block 1502, where the tree manager 116 submits a request to a cycle remover 118 to add the newly freed block to a free block tree. Next, at block 1504, the cycle remover 118 determines a number of blocks needed to expand the free block tree to hold the new block. This can be handled in a number of ways. In one embodiment, the tree is traversed from the root node to the point where the add would take place, keeping track of how many additional metadata blocks would be needed to grow the tree to hold the new block. To do this, a counter begins at a value of one, and the traversal begins at the root node and continues to the leaf node where the add will take place. At each level of the tree, the number of children of the present node is counted (either other intermediate nodes, leaf nodes, or key-value pairs). If the number of children is less than the maximum number of children (in other words, if another child could be added to the present node without splitting the present node or moving key-value pairs to neighboring nodes), the counter is reset to zero. Since the split of a node can cascade up the tree until a node is found that has room available, this technique counts the number of nodes that must be added up to the point where such a cascade ceases.

The method 1500 then proceeds to block 1506, where the cycle remover 118 requests the determined number of blocks from a Q-Block. Next, at decision block 1508, a test is performed to determine whether enough blocks are available in the Q-Block to service the request. If the answer to the test at decision block 1508 is YES, the method 1500 proceeds to a continuation terminal ("terminal A"). Otherwise, if the answer to the test at decision block 1508 is NO, the method 1500 proceeds to another continuation terminal ("terminal B").

From terminal B (FIG. 15B), the method 1500 proceeds to block 1510, where the cycle remover 118 removes enough free blocks from the free block tree to fulfill the request for nodes, and adds them to the Q-Block. Next, in block 1512, the cycle remover 118 determines if any other blocks from the free block tree need removal, removes the blocks from the free block tree, and adds them to the Q-Block. The method 1500 then proceeds to terminal A, and from there to block 1514, where the cycle remover 118 removes the requested number of blocks from the Q-Block. Next, in block 1516, the cycle remover 118 uses the returned blocks to construct the needed portions of the free block tree, and adds the new block to the free block tree. The method 1500 then proceeds to an end block and terminates.

In some embodiments, adding and removing transacted state blocks and working state blocks to a Q-Block is slightly more complicated, as the cycle remover 118 treats such blocks differently, and takes into account transaction point processing. Q-Blocks in these embodiments have two arrays of blocks: an almost free array and a free array. When a pair of blocks is deallocated, both blocks of the pair of blocks are added to one of the almost free array or the free array. If one of the blocks of the pair of deallocated blocks contains transacted data, then the pair of blocks is added to the almost free array. If neither of the blocks of the pair of deallocated blocks contains transacted data, then the pair of blocks is added to the free array. For blocks in the almost free array, the cycle remover will only use the alternate blocks to fulfill requests for allocations to avoid overwriting transacted data. For blocks in the free array, the cycle remover will use any of the blocks to fulfill requests. Also, upon the completion of a transaction point, all of the entries in the almost free array are moved to the free array, as the transacted data in the deallocated blocks will no longer be needed.

While illustrative embodiments have been illustrated and described, it will be appreciated that various changes can be made therein without departing from the spirit and scope of the invention. For instance, although certain components have been described as individual components, in some embodiments, these components are combined to form single components, or have their functionality split amongst several disparate components. Also, while there may be certain advantages to using portions of the subject matter described above together in the same embodiment, each feature described above may be used separately to achieve the benefits of the features individually.

The invention claimed is:

1. An electronic device for fault-tolerant storage of data, comprising:
   one or more processors; and
   a storage medium readable by the one or more processors via a file system driver;
   wherein the storage medium has stored thereon file system structures including a master block which references a metaroot for storing file directory information and file allocation information;
   wherein the metaroot includes a reference to an allocation tree structure, and wherein the metaroot references a Q-Block for management of unallocated memory blocks;
   wherein the allocation tree structure tracks allocated storage blocks and free blocks, and wherein the allocation tree structure tracks free blocks in a free block tree having a root block, a plurality of intermediate blocks, and a plurality of leaf blocks;
   wherein the root block includes a plurality of pointers to intermediate blocks;
   wherein each intermediate block of the plurality of intermediate blocks includes a plurality of pointers to intermediate blocks or leaf blocks;
   wherein each leaf block of the plurality of leaf blocks indicates one or more free blocks on the storage medium;
   wherein the allocated storage blocks tracked by the allocation tree structure include allocations of blocks for the free block tree; and
   wherein the Q-Block is configured to track freed storage block allocations that are removed from the free block tree, and to supply storage block allocations to add blocks to the free block tree;
   wherein tracking allocated storage blocks and free blocks includes:

determining a number of blocks needed to expand the free block tree to hold a newly freed block;
obtaining the determined number of blocks from the Q-block; and
using at least the obtained blocks to add an indication of the newly freed block to the free block tree; and
wherein obtaining the determined number of blocks from the Q-block includes, in response to determining that a number of blocks stored in the Q-block is less than the determined number of blocks:
removing a first number of blocks from the free block tree to increase the number of blocks stored in the Q-block to the determined number of blocks; and
adding the blocks removed from the free block tree to the Q-block.

2. The device of claim 1, wherein the master block also references a second metaroot, and wherein the storage medium has stored thereon an indication of which of the metaroot versus the second metaroot are currently valid.

3. The device of claim 1, wherein the storage medium comprises a flash memory.

4. The device of claim 1, wherein the electronic device is a digital camera, a cell phone, a personal digital assistant, a laptop computer, a desktop computer, or a solid state drive.

5. The device of claim 1, wherein obtaining the determined number of blocks from the Q-block further includes, in response to determining that the number of blocks stored in the Q-block is less than the determined number of blocks:
removing additional blocks from the free block tree as part of at least one merge caused by removing the first number of blocks from the free block tree; and
adding the additional blocks removed from the free block tree to the Q-block.

6. A method of fault-tolerant storage of data, the method comprising:
storing, by one or more processors of an electronic device, file system structures including a master block on a storage medium, wherein the master block references a metaroot for storing file allocation information;
wherein the metaroot includes a reference to an allocation tree structure, and wherein the metaroot references a Q-Block for management of unallocated memory blocks;
wherein the allocation tree structure includes a free block tree having a root block, a plurality of intermediate blocks, and a plurality of leaf blocks;
wherein the root block includes a plurality of pointers to intermediate blocks;
wherein each intermediate block of the plurality of intermediate blocks includes a plurality of pointers to intermediate blocks or leaf blocks; and
wherein each leaf block of the plurality of leaf blocks indicates one or more free blocks on the storage medium;
tracking, using the allocation tree structure, allocated storage blocks and free blocks, including tracking allocations of blocks for the free block tree;
tracking, using the Q-Block, freed storage block allocations that are removed from the free block tree; and
supplying, using the Q-Block, storage block allocations to add blocks to the free block tree;
wherein tracking allocated storage blocks and free blocks includes:
determining a number of blocks needed to expand the free block tree to hold a newly freed block;
obtaining the determined number of blocks from the Q-block; and
using at least the obtained blocks to add an indication of the newly freed block to the free block tree; and
wherein obtaining the determined number of blocks from the Q-block includes, in response to determining that a number of blocks stored in the Q-block is less than the determined number of blocks:
removing a first number of blocks from the free block tree to increase the number of blocks stored in the Q-block to the determined number of blocks; and
adding the blocks removed from the free block tree to the Q-block.

7. The method of claim 6, wherein the master block also references a second metaroot, and wherein the method further comprises:
storing, on the storage medium, an indication of which of the metaroot versus the second metaroot are currently valid.

8. The method of claim 6, wherein the storage medium comprises a flash memory.

9. The method of claim 6, wherein obtaining the determined number of blocks from the Q-block further includes, in response to determining that the number of blocks stored in the Q-block is less than the determined number of blocks:
removing additional blocks from the free block tree as part of at least one merge caused by removing the first number of blocks from the free block tree; and
adding the additional blocks removed from the free block tree to the Q-block.

10. A nontransitory computer-readable medium having computer-executable instructions stored thereon that, in response to execution by one or more processors of an electronic device, cause the electronic device to:
store file system structures including a master block on a storage medium, wherein the master block references a metaroot for storing file allocation information;
wherein the metaroot includes a reference to an allocation tree structure, and wherein the metaroot references a Q-Block for management of unallocated memory blocks;
wherein the allocation tree structure includes a free block tree having a root block, a plurality of intermediate blocks, and a plurality of leaf blocks;
wherein the root block includes a plurality of pointers to intermediate blocks;
wherein each intermediate block of the plurality of intermediate blocks includes a plurality of pointers to intermediate blocks or leaf blocks; and
wherein each leaf block of the plurality of leaf blocks indicates one or more free blocks on the storage medium;
track, using the allocation tree structure, allocated storage blocks and free blocks, including tracking allocations of blocks for the free block tree;
track, using the Q-Block, freed storage block allocations that are removed from the free block tree; and
supply, using the Q-Block, storage block allocations to add blocks to the free block tree;
wherein tracking allocated storage blocks and free blocks includes:
determining a number of blocks needed to expand the free block tree to hold a newly freed block;
obtaining the determined number of blocks from the Q-block; and
using at least the obtained blocks to add an indication of the newly freed block to the free block tree; and
wherein obtaining the determined number of blocks from the Q-block includes, in response to determining that a number of blocks stored in the Q-block is less than the determined number of blocks:
  removing a first number of blocks from the free block tree to increase the number of blocks stored in the Q-block to the determined number of blocks; and
  adding the blocks removed from the free block tree to the Q-block.

11. The nontransitory computer-readable medium of claim 10, wherein the master block also references a second metaroot, and wherein the instructions further cause the electronic device to:
  store, on the storage medium, an indication of which of the metaroot versus the second metaroot are currently valid.

12. The nontransitory computer-readable medium of claim 10, wherein the storage medium comprises a flash memory.

13. The nontransitory computer-readable medium of claim 10, wherein the electronic device is a digital camera, a cell phone, a personal digital assistant, a laptop computer, a desktop computer, or a solid state drive.

14. The nontransitory computer-readable medium of claim 10, wherein obtaining the determined number of blocks from the Q-block further includes, in response to determining that the number of blocks stored in the Q-block is less than the determined number of blocks:
  removing additional blocks from the free block tree as part of at least one merge caused by removing the first number of blocks from the free block tree; and
  adding the additional blocks removed from the free block tree to the Q-block.

* * * * *